(12) United States Patent
Papanikolaou et al.

(10) Patent No.: US 8,037,430 B2
(45) Date of Patent: Oct. 11, 2011

(54) METHOD FOR EXPLORING FEASIBILITY OF AN ELECTRONIC SYSTEM DESIGN

(75) Inventors: Antonis Papanikolaou, Athens (GR); Miguel Miranda, Kessel-Lo (BE); Philippe Roussel, Linden-Lubbeek (BE)

(73) Assignee: IMEC, Leuven (BE)

( * ) Notice: Subject to any disclaimer, the term of this patent is extended or adjusted under 35 U.S.C. 154(b) by 233 days.

(21) Appl. No.: 11/769,546

(22) Filed: Jun. 27, 2007

(65) Prior Publication Data

US 2008/0005707 A1   Jan. 3, 2008

Related U.S. Application Data

(60) Provisional application No. 60/817,527, filed on Jun. 28, 2006.

(51) Int. Cl.
*G06F 17/50*   (2006.01)
(52) U.S. Cl. ............................................. 716/56
(58) Field of Classification Search .................. 716/4, 5, 716/19–21, 51, 52, 56
See application file for complete search history.

(56) References Cited

U.S. PATENT DOCUMENTS

| 6,880,136 B2* | 4/2005 | Huisman et al. ................... 716/4 |
| 6,888,564 B2* | 5/2005 | Caviedes et al. .............. 348/180 |
| 7,539,893 B1* | 5/2009 | Ferguson ........................... 714/6 |
| 2007/0098116 A1 | 5/2007 | Kim et al. |
| 2007/0277134 A1* | 11/2007 | Zhang et al. ........................ 716/6 |
| 2008/0046692 A1* | 2/2008 | Michalak et al. .............. 712/214 |

FOREIGN PATENT DOCUMENTS

| EP | 1583009 A1 | 10/2005 |
| GB | 0624846.2 | 12/2006 |

OTHER PUBLICATIONS

Agarwal et al., Process variation in embedded memories: failure analysis and variation aware architecture, *IEEE Journal of Solid-State Circuits* (Sep. 2005), vol. 40 No. 9:1804-1814.
Agarwal et al., Statistical timing analysis using bounds and selective enumeration, *IEEE Trans. on CAD* (Sep. 2003), vol. 22 No. 9.
Antreich et al., Circuit analysis and optimization driven by worst-case distances, *IEEE Trans. on CAD* (Jan. 1994), vol. 13, No. 1.
Austin et al., Making typical silicon matter with razor, *IEEE Computer* (Mar. 2004) pp. 57-65.
Benini et al., System-level power optimization techniques and tools, *ACM Trans. on Design Automation for Embedded Systems*, vol. 5, Issue 2, Apr. 2000, pp. 288-293.

(Continued)

*Primary Examiner* — Vuthe Siek
(74) *Attorney, Agent, or Firm* — Knobbe Martens Olson & Bear LLP

(57) ABSTRACT

One inventive aspect relates to a method of determining an estimate of system-level yield loss for an electronic system comprising individual components subject to manufacturing process variability leading to manufacturing defects. The method comprises obtaining a description of the composition of the electronic system in terms of which individual components are used. The method further comprises obtaining statistical properties of the performance of individual components of the electronic system with respect to first and second performance variables, e.g. energy consumption and delay, the statistical properties including correlation information of the first and second performance variables. The method further comprises obtaining information about execution of an application on the system, e.g. a number of accesses of a component by an application. The method further comprises propagating the statistical properties of the first and second performance variables of the individual components to the electronic system so that the correlations between the first and second performance variables are preserved, the propagating taking into account the application information.

25 Claims, 15 Drawing Sheets

OTHER PUBLICATIONS

Blaauw et al., CAD tools for variation tolerance, *Design Automation Conference* (Jun. 2005), 766.

Borkar, Designing reliable systems from unreliable components: the challenges of transistor variability and degradation, *IEEE Micro* (Nov./Dec. 2005), vol. 25, No. 6, pp. 10-16.

Chang et al., Statistical timing analysis considering spatial correlations using a single PERT-like traversal, *Intl. Conf. on Computer Aided Design* (Nov. 11-13, 2003), pp. 621-625.

Genest et al., Everything you always wanted to know about copula modeling but were afraid to ask, *Journal of Hydrologic Engineering* (Mar. 21, 2006).

Hong et al., On-line scheduling of hard real-time tasks on variable voltage processors, *Intl. Conf. on Computer Aided Design* (Nov. 1998), pp. 653-656, San Jose, CA.

Jacobs et al., Gate sizing using a statistical delay models, Proceedings of the conference on Design, Automation and Test in Europe (Mar. 27-30, 2000) Paris, France.

Mani et al., A new statistical optimization algorithm for gate sizing, *Intl. Conf. on Computer Design* (Oct. 11-13, 2004), pp. 272-277.

Mani et al., An efficient algorithm for statistical minimization of total power under timing yield constraints, *Design Automation Conference* (Jun. 13-17, 2005), pp. 309-314, Anaheim, CA.

Montgomery, Applied statistics & probability for engineers, Chapter 5: Joint Probability Distributions, John Wiley & Sons, Jan. 1994.

Nose et al. Vth-hopping scheme to reduce subthreshold leakage for low-power processors, *IEEE J. of Solid-State Circuits* (Mar. 2002), vol. 37 No. 3, pp. 413-419.

Okuma et al. Real-time task scheduling for a variable voltage processor, *Intl. Symposium on System Synthesis* (Nov. 1999), 24-29.

Papanikolaou et al., A system-level methodology for fully compensating process variability impact of memory organizations in periodic applications, *Intl. Conference on HW/SW Co-design and System Synthesis (CODES+ISSS)* (Sep. 19-21, 2005) New Jersey, USA.

Patel et al., Synthesis of partitioned shared memory architectures for energy-sufficient multi-processor SoC, Proceedings of the Conference on Design, Automation and Test in Europe, Feb. 16-20, 2004, pp. 700-701.

Srivastava et al., Accurate and efficient gate-level parametric yield estimation considering correlated variations in leakage power and performance, *Design Automation Conference* (Jun. 13-17, 2005), pp. 535-540, Anaheim, CA.

Srivastava et al., Concurrent sizing, Vdd and Vth assignment for low power design, IEEE (Feb. 2004), 718-719.

Srivastava et al., Statistical optimization of leakage power considering process variations using dual-Vh and sizing, *Design Automation Conference* (Jun. 7-11, 2004), pp. 773-778, San Diego, CA.

Visweswariah, Statistical timing of digital integrated circuits, *Microprocessor Circuit Design Forum at ISSCC* (2004).

Viswewariah, Death, taxes and failing chips, *Design Automation Conference* (Jun. 2-6, 2003), pp. 343-347, Anaheim, CA.

Wang et al., Systematic analysis of energy and delay impact of very deep submicron process variability effects in embedded SRAM modules, *Proc. 4th ACM/IEEE Design and Test in Europe Conf.* (Mar. 2005), Munich, Germany, pp. 914-919.

Wang et al., Variable tapered pareto buffer design and implementation techniques allowing run-time configuration for low power embedded SRAMs, *IEEE Trans. on VLSI* (Oct. 2005), 13(10):1127-1135.

Yang et al., Advanced timing analysis based on post-OPC extraction of critical dimensions, *DAC* (Jun. 13-17, 2005), pp. 359-364, Anaheim, CA.

European Search Report dated Oct. 22, 2007 in European Application 07075505.3.

Ashouei et al, Statistical Estimation of Correlated Leakage Power Variation and Its Application to Leakage—Aware Design, Proceedings of 19th International Conference on VLSI Design, Jan. 3-7, 2006, 7 pages.

ARM The Architecture for the Digital World, http://www.arm.com/products/physical-ip/embedded-memory-ip/index.php, accessed Feb. 21, 2011.

Bratley et al., A Guide to Simulation, 1983, pp. 42-72, Springer-Verlag New York Inc., New York.

Chen et al, Area Fill Synthesis for Uniform Layout Density, IEEE Transactions on Computer-Aided Design of Integrated Circuits and Systems, Oct. 2002, vol. 21, No. 10, pp. 1132-1147.

Clark et al., The Greatest of a Finite Set of Random Variables, Operations Research, Mar.-Apr. 1961, vol. 9, No. 2, pp. 145-162.

Dierickx et al., Propagating Variability from Technology to System Level, IEEE, 2007, pp. 1-6.

Dierickx et al., "VAM IF" Variability and Reliability Aware Modeling Information Format Definition and User Manual, Jul. 2007.

Grobman et al, Reticle Enhancement Technology: Implications and Challenges for Physical Design, 38th Conference on Design Automation, DAC Jun. 18-22, 2001, pp. 72-78, Las Vegas, Nevada.

Gupta et al, Manufacturing-Aware Physical Design, IEEE/ACM Int'l Conference on Computer-Aided Design, ICCAD Nov. 11-13, 2003, pp. 681-687, San Jose, California.

Gupta et al, Toward a Systematic-Variation Aware Timing Methodology, Design Automation Conference, Jun. 7-11, 2004, pp. 321-326, San Jose, California.

Gupta, et al, Toward Performance-Driven Reduction of the Cost of RET-Based Lithography Control, Proc. SPIE, Conference date: Feb. 27, 2003, Online publication date: Jul. 31, 2003, vol. 5043, No. 123.

Habitz, P., Chip Timing and Optimization using Statistical Analysis Methods, ASICs Timing Methodology, from Practical Aspects of Coping with Variability: An Electrical View, Tutorial at ACM/IEEE Design Automation Conf. Jul. 24-28, 2006.

International Technology Roadmap for Semiconductors, http://public.itrs.net, 2005.

Kim et al., TCAD-Based Statistical Analysis and Modeling of Gate Line-Edge Roughness Effect on Nanoscale MOS Transistor Performance and Scaling, IEEE Transactions on Semiconductor Manufacturing, May 2004, vol. 17, No. 2, pp. 192-200.

Lin, X.W., Design and Process Variability—the Source and Mechanisms, from Practical Aspects of Coping with Variability: An Electrical View, Tutorial at ACM/IEEE Design Automation Conf. Jul. 24-28, 2006.

Nikolic, B., Capturing Variability, from Practical Aspects of Coping with Variability: An Electrical View, Tutorial at ACM/IEEE Design Automation Conf. Jul. 24-28, 2006.

Pelgrom et al. Matching Properties of MOS Transistors, IEEE Journal of Solid-State Circuits, Oct. 1989, vol. 24, No. 5, pp. 1433-1440.

Rao et al, Parametric Yield Estimation Considering Leakage Variability, Annual ACM IEEE Design Automation Conference, Jun. 7-11, 2004, pp. 442-447, San Diego, California.

Riko, R., DFM View, Methodology Perspectives, Techniques for Stitching Together DFM Methods and Timing Optimization into a Usable Methodology, from Practical Aspects of Coping with Variability: An Electrical View, Tutorial at ACM/IEEE Design Automation Conf. Jul. 24-28, 2006.

Sinha et al., Advances in Computation of the Maximum of a Set of Random Variables, Proceedings of the 7th International Symposium on Quality Electronic Design, 2006, 6 pages.

Stok et al, Structured CAD: Technology Closure for Modern ASICs, Design Automation and Test in Europe Conference and Exhibition, Feb. 2004, p. xxxi (1 page).

Synopsys, http:/www.synopsys.com/Tools/Pages/default.aspx, accessed Apr. 21, 2011.

Visweswariah et al, First-Order Incremental Block-Based Statistical Timing Analysis, Design Automation Conference, Jun. 7-11, 2004, pp. 331-336.

Weaver, B., Probability and Hypothesis Testing, Oct. 2005 (31 pages).

Wettstein et al., Random Dopant Fluctuation Modelling with the Impedance Field Method, IEEE, 2003, pp. 91-94.

Zhao et al., New Generation of Predictive Technology Model for Sub-45 nm Early Design Exploration, IEEE Transactions on Electron Devices, Nov. 2006, vol. 53, No. 11, pp. 2816-2823.

Office Action dated Oct. 29, 2010 in U.S. Appl. No. 12/144,524.

\* cited by examiner

METHOD FOR EXPLORING FEASIBILITY OF AN ELECTRONIC SYSTEM DESIGN

CROSS REFERENCE TO RELATED APPLICATIONS

This application claims priority under 35 U.S.C. §119(e) to U.S. provisional patent application 60/817,527 filed on Jun. 28, 2006, which application is hereby incorporated by reference in its entirety.

BACKGROUND OF THE INVENTION

1. Field of the Invention

The invention relates to methods for exploring feasibility of an electronic system design and to electronic systems selected in accordance with such exploration method. The methods in accordance with embodiments of the present invention are particularly suited for electronic systems being fabricated in nanometer technology.

2. Description of the Related Technology

Yield, i.e. the proportion of devices produced which function correctly, can be classified into two different types, functional and parametric yield. Functional yield can be defined as the percentage of samples that produce the correct output for all the possible inputs. Similarly parametric yield can be defined as the percentage of samples that produce the correct output for all the possible inputs under a constraint on one of its performance parameters. Usual constraints are either timing constraints or energy budgets that need to be met.

Process variability in nanometer technology has a detrimental impact on the performance of electronic systems (like or including memories). The impact of process variability on the energy consumption and performance of integrated circuits is significant already now, and is predicted to grow still more as technology scales further. This impact is directly translated into functional and parametric yield loss at the system component level. Although at the component level the parameter variation due to process variability may not be fatal, timing yield loss at the component level may result in functional yield loss at the system level for synchronous systems, due to timing violations.

Conventional yield models do not allow accurately analyzing this, at least not at the system level.

Several approaches exist to turn this functional yield loss at least partly into parametric timing yield loss at the system level, for example by frequency binning at manufacturing-time, as described by M. Mani et al. in "A new statistical optimization algorithm for gate sizing", Intl. Conf. on Computer Design, pp. 272-277, October 2004. Each chip is tested at-speed after fabrication and the maximum clock frequency it can sustain without loss of functionality is determined. This means that all the system components of the chip, or the respective clock domain, should be operational under this clock frequency for the chip to yield. The system timing parametric yield is defined as the percentage of chips that can run at a given clock frequency. This technique significantly increases the number of chips that are functionally operational, but most of them cannot meet the initial target clock frequency. This is not a problem in the general purpose processor domain, but it will result in application deadline misses for embedded real-time systems, which is one of the reasons why frequency binning is not used in the embedded domain.

Embedded systems that run real-time, power sensitive applications are becoming an important part of the consumer electronic product market. System level design in the embedded systems domain has primarily been concerned with three main cost metrics: timing, energy consumption and area. Timing is important because embedded system typically run applications with hard real-time deadlines, such as communication services and multimedia applications. Minimizing energy consumption, on the other hand, can not only extend the time between battery recharges, but also enables new handheld applications and high-end mobile computing. A lot of research has been performed on how to minimize energy consumption, by employing run-time techniques such as voltage scaling for instance. These two metrics, together with area, which has a direct proportional impact on cost, define the quality of the design.

Estimating both energy and timing parametric yield at the system level during the design trajectory can give valuable information about technical and financial aspects of the design. D. Blaauw et al., in "CAD tools for variation tolerance", Design Automation Conference, p. 766, 2005, have already identified the lack of yield estimation tools before synthesis and the necessity to have them. Parametric yield is conventionally evaluated on a component per component basis. Currently, system parametric yield is estimated as the product of the parametric yield of all the system components. This leads to a pessimistic worst-case estimation, because it assumes that all the components must meet the same performance requirements. This is an option mostly used in the context of general purpose architecture design, where the processors need to handle any application that is ran on them. The main assumption so far at the system level design abstraction has been that timing and energy consumption of the individual system components and the final system implementation itself are deterministic and predictable.

However, in the portable battery-operated real-time embedded system domain, where the applications that are going to run on the system are known and the most important constraint is meeting the application deadlines and not whether the system components meet their nominal clock period specifications, the system level parametric yield estimation can be significantly improved.

The fact that, for battery-operated systems the utilization scenarios can be predicted at design-time because the applications are known a priori, gives an opportunity to meet the real-time application deadlines, without having to be so strict that all the components have to meet the nominal parametric specifications all of the time. Design techniques exist today that can allow to globally re-decide on the distribution of the available time until the application deadline and on the configuration of the components in order to meet the application deadlines. One of the most prominent techniques is Dynamic Voltage and Frequency Scaling (DVFS), as described by T. Okuma et al. in "Real-time task scheduling for a variable voltage processor", Intl. Symposium on System Synthesis, pp. 24-29, November 1999. Dynamic Voltage and Frequency Scaling uses the supply voltage as a configuration parameter in order to minimize energy/power consumption and the clock frequency as a constraint to guarantee meeting the application deadlines. Another technique is Vth-hopping, as described by K. Nose et al. in "$V_{th}$-hopping scheme to reduce subthreshold leakage for low-power processors", IEEE J. of Solid-State Circuits, vol. 37, no. 3, pp. 413-419, March 2002, which uses the threshold voltage of the transistors as a configuration parameter. The basic idea behind all these techniques is that the clock frequency will be defined based on the predicted system workload [I. Hong, M. Potkonjak, M. Srivastava, "On-line scheduling of hard real-time tasks on variable voltage processors", Intl. Conf. on Computer Aided Design, pp. 653-656, November 1998] so as to just meet the next application deadline and a configuration parameter, e.g.

$V_{dd}$ or $V_{th}$ will be configured in order to minimize energy consumption for the given clock frequency. Other techniques could also be used to optimize the energy-performance trade-offs.

Two important assumptions are supporting the fore-mentioned techniques. The first is that the relation between the configuration parameter and the speed of each component is deterministic and known at design-time. Process variability, however, introduces non-determinism in these relations and jeopardizes the applicability of these techniques. The second assumption is that relaxing the clock frequency does not degrade the parametric yield of the system, because the application deadlines will be met. But, they still use the nominal target clock frequency as the timing reference for the calculation of the system parametric yield. If the slowest system component cannot meet this nominal target, the system is considered as non-functional, because the slow component would cause timing violations. Hence, the conventional parametric yield metrics cannot fully capture the effect of frequency scaling, especially in case the operating frequency is tuned to be faster than the nominal frequency.

Limited variations due to process variability have been tackled by embedding worst-case margins in the design of the system components, such as e.g. processors and memories, so that the specified performance and energy consumption can be guaranteed for use by the system designers.

Technology scaling past the 90 nm technology node, however, introduces a lot more unpredictability in the timing and energy consumption of the designs due to process variability. Treating these metrics at the system design level as deterministic values requires the design margins to become so large that they can eat up all the benefits of moving to a more advanced technology node. Therefore some degree of uncertainty will always have to be tolerated in the component. This has to be considered during circuit and even architecture design. This has to lead to new statistical design paradigms [S. Borkar, "Designing reliable systems from unreliable components: the challenges of transistor variability and degradation", IEEE Micro, vol. 25, iss. 6, November-December 2005.] such as statistical timing analysis or even more general, yield-aware design [A. Agarwal et al., "Process variation in embedded memories: failure analysis and variation aware architecture" IEEE Journal of Solid-State Circuits, vol 40, iss 9, September 2005 pp. 1804-1814, M. Mani et al, "An efficient algorithm for statistical minimization of total power under timing yield constraints", Design Automation Conference, 2005.].

Depending on the component being considered (e.g. memory or datapath), energy and/or performance vs. area trade-off decisions have to be made [C. Visweswariah, "Statistical Timing of Digital Integrated Circuits" Microprocessor Circuit Design Forum at ISSCC 2004]. However, for embedded system design the most critical trade-offs are not made at the component or IP block level, but at the architecture or even at the application level. Therefore solutions for (parametric) yield aware design have started being developed that tackle the problem at the architecture level while allowing some degree of uncertainty in the parametric energy and performance figures of the IP blocks [T. Austin et al., "Making typical silicon matter with Razor", IEEE Computer, pp. 57, March 2004, A. Papanikolaou et al., "A System-Level Methodology for Fully Compensating Process Variability Impact of Memory Organizations in Periodic Applications", Intl. Conference on HW/SW Co-design and System Synthesis (CODES+ISSS), September 2005]. These solutions aim to tackle the system-level yield loss that is the result of timing violations due to the parametric drift in the performance of the individual system components caused by random process variability.

At the circuit-level, statistical timing analysis has been proposed as a method to analyze the parametric timing yield of the circuits, as described by E. Jacobs et al. in "Gate sizing using a statistical delay models", Design, Automation and Test in Europe, 2000. A lot of research has been done on analysis of timing yield, for instance by K. Antreich et al. in "Circuit analysis and optimization driven by worst-case distances", IEEE Trans. on CAD, January 1994, and by A. Srivastava et al. in "Statistical optimization of leakage power considering process variations using dual-Vh and sizing", Design Automation Conference, June 2004. Lately the focus has been shifted toward optimization of the circuits in order to achieve a larger timing yield, as described by A. Agarwal et al. in "Statistical timing analysis using bounds and selective enumeration", IEEE Trans. on CAD, vol 22, no. 9, September 2003. Only very recently, statistical timing analysis has been combined with a power optimization methodology based on the allocation of high or low Vth gates in the circuits in order to meet a given timing and minimize power consumption, as described by H. Chang et al. in "Statistical timing analysis considering spatial correlations using a single PERT-like traversal", Intl. Conf on Computer Aided Design, 2003.

Design for Yield and Design for Manufacturing have become very popular research issues in the recent years. The bulk of the work, however, has been concentrated either at the printing level using post processing techniques or at the standard cell level by characterizing the yield of particular layout styles [J. Yang et al, "Advanced timing analysis based on post-OPC extraction of critical dimensions" DAC, 359-364, 2005.]. Techniques of the fist type such as Optical Proximity Correction aim to counteract the imperfections in the manufacturing process and to increase the device-level functional yield of the chips by improving the quality of the drawn features.

At higher abstraction levels, research has been focused on the gate-level abstraction level of the circuits. Statistical timing analysis [C. Viswewariah, "Death, taxes and failing chips", Design Automation Conference, pp. 343, 2003.] aims at estimating the parametric performance of the circuit. More recent research has introduced circuit level timing optimizations [A. Srivastava et al, "Concurrent Sizing, Vdd and Vth Assignment for low power design", DATE, 718-719, 2004.] and combined power and timing optimization [M. Mani et al, "An efficient algorithm for statistical minimization of total power under timing yield constraints", Design Automation Conference, 2005.] on top of statistical timing analysis.

A gate level approach has been proposed which can accurately estimate the bivariate timing/leakage power distribution of a combinatorial circuit [A. Sriristava et al., "Accurate and efficient gate-level parametric yield estimation considering correlated variations in leakage power and performance", Design Automation Conference, pp. 535-540, June 2005]. The correlations between leakage power and performance are taken into account and the resulting joint distribution at the circuit level is generated. The assumption made in this work is that the underlying gate distributions are Gaussian. Such a technique could be properly adapted to handle the yield estimation of a memory organization, if the memory level distributions are assumed to be Gaussian. It cannot handle the case of configurable memories/components, however, or the case of any kind of component with non-Gaussian energy/performance distribution.

The fore-mentioned methods are applicable only at the circuit level, where each circuit is a collection of interconnected logic gates. The methods that perform optimization rely on design-time decisions, such as high-$V_{th}$ gate allocation and gate sizing. As a result, all of them use the conventional parametric yield metric, which for embedded systems completely ignores the impact of the application that is running and the mapping of that application on the platform. Furthermore, the energy overhead resulting from the design margins introduced at the circuit level to improve parametric yield become prohibitive for battery operated embedded systems.

Parametric yield has not been studied at the application level, especially not for systems that can adapt their clock frequency and energy consumption at run-time. Timing parametric yield can only be defined conventionally for a given timing reference which is assumed to be the clock period.

SUMMARY OF CERTAIN INVENTIVE ASPECTS

Certain inventive aspects provide good methods or apparatus for determining an estimate of system-level yield loss for an electronic system comprising individual components subject to process variability leading to manufacturing defects.

Certain inventive aspects relate to a method for exploring feasibility of an electronic system design, for example to be fabricated in nanometer technology, in particular by using a method for determining yield loss, from a system-level representation of such electronic system.

This yield determination method aids the designer into making educated trade-offs at the architecture level between energy consumption and yield as a function of different design options, each design option having a particular impact on manufacturing variation.

Although the yield estimation is performed at system and/or architectural level of an electronic system, still the accuracy of this technique is very high, which enables an early exploration of the available options.

A first inventive aspect provides a method for determining an estimate of system-level yield loss for an electronic system comprising individual components subject to manufacturing process variability leading to manufacturing defects. The method comprises obtaining a description of the composition of the electronic system in terms of which individual components are used; obtaining statistical properties of the performance of individual components of the electronic system with respect to first and second performance variables, the statistical properties including correlation information of the first and second performance variables; obtaining information about execution of an application on the system, e.g. a number of accesses of a component by an application, and propagating the statistical properties of the first and second performance variables of the individual components to the electronic system so that the correlations between the first and second performance variables are preserved, the propagating taking into account the application information. The first and second performance variables may for example be dynamic energy and delay; or leakage energy, optionally weighted with activity level (power ON/power OFF), and dynamical energy; or leakage energy and delay. Propagating the statistical properties of the first and second performance variables may be such that outliers in the statistical properties of the first and second performance variables are included.

In particular embodiments of the present invention, the first performance variable is delay, and the second performance variable is energy.

In embodiments of the present invention, propagation laws of the first and second performance variables from the component-level to the system-level are different. As an example only, the propagation law of the first performance variable may be a max operator, and the propagation law of the second performance variable may be a sum operator. The sum operator may provide a weighted sum.

In accordance with embodiments of the present invention, the statistical properties of the performance of individual components may be probability density functions.

The method according to embodiments of the present invention may be adapted for estimating the system-level yield loss of electronic systems, such as for example memory organizations, that use configuration options allowing runtime first and second performance variable trade-offs, e.g. energy/delay trade-offs, by using a plurality of bivariate probability density functions Propagating the statistical properties may comprise manipulation of the probability density functions. Manipulation of the probability density functions may be an analytical calculation or a numerical calculation.

Propagating the statistical properties may comprise separately propagating the probability density functions for the first performance variable and for the second performance variable. This separately propagating the probability density function may comprise an intermediate step of projecting probability density functions on the first performance variable axis, e.g. time, and second performance variable axis, e.g. energy, and subsequently performing transformations related to the respective first and second performance variable metric, e.g. timing and energy metric.

Alternatively, propagating the statistical properties may comprise simultaneously propagating a combined probability density function for the first and second performance variables. The combined propagation may be described, for two bivariate PDFs, by $$f_c[t_d, P_w] = \int_{-\infty}^{\tau_d} \int_{-\infty}^{\infty} (f_1[t_d, P_w - v_p]f_2[u_t, v_p] + f_1[u_t, P_w - v_p]f_2[t_d, v_p])dv_p du_t,$$

wherein $f_c[t_d, P_w]$ is the combined first performance variable—second performance variable PDF, $f_1$ is a first first performance variable—second performance variable PDF, and $f_2$ is a first first performance variable—second performance variable PDF.

According to embodiments of the present invention, the statistical properties of the performance of individual components may have a Gaussian distribution. According to alternative embodiments, the statistical properties of the performance of individual components may comprise non-Gaussian distributions.

In embodiments of methods according to the present invention, obtaining statistical properties of the performance of the individual components may be done via transistor-level simulations, statistical estimation, Monte-Carlo simulations or measurements.

A method according to embodiments of the present invention may comprise calculating the probability distribution of the delay of the electronic system from the information of its underlying individual components.

A method according to embodiments of the present invention may comprise calculating the probability distribution of the energy consumption of the electronic system from the information of its underlying individual components. Calculating the probability distribution of the energy consumption of the electronic system may include using Fourier transforms.

A method according to embodiments of the present invention may furthermore comprise obtaining a description of an application to be executed on the electronic system, the application comprising a set of individual tasks which are subject to statistical variability, the description of the application being function of the set of tasks to be executed; obtaining statistical properties of the individual tasks of the application with respect to at least the first and second performance variables, the statistical properties including correlation information of the first and second performance variables; obtaining information about the electronic system onto which the application is to be executed, e.g. a number of accesses of components; and propagating the statistical properties of the first and second performance variables of the individual tasks to the application so that the correlations between the first and second performance variables are preserved, the propagating taking into account the information about the system onto which the application is to be executed. Preservation of the correlations between the first and second performance variables may include including outliers in statistical properties.

Obtaining statistical properties of the individual tasks of the application to be executed on the electronic system may be based on profiling a run-time workload prediction technique.

A method according to embodiments of the present invention may furthermore comprise taking into account variability on tasks performance variables due to changing clock frequency at run-time. This changing clock-frequency at run-time may be obtained by applying Dynamic Frequency Scaling (DFS).

A further inventive aspect provides a method for determining an estimate of system-level yield loss for an application comprising a set of individual tasks which are subject to statistical variability. The method comprises obtaining a description of the application in function of the set of tasks to be executed; obtaining statistical properties of the individual tasks of the application with respect to first and second performance variables, the statistical properties including correlation information of the first and second performance variables; obtaining information about a system onto which the application is executed, the information for example being a number of accesses of components of the system; and propagating the statistical properties of the first and second performance variables of the individual tasks to the application so that the correlations between the first and second performance variables are preserved, the propagating taking into account the information about the system onto which the application is executed. Propagating the statistical properties of the first and second performance variables may be such that outliers in the statistical properties of the first and second performance variables are included.

The statistical variability on the individual tasks may be due to a run-time change of clock frequency of the electronic system onto which the application is executed, for example when applying Dynamic Frequency Scaling (DFS).

Obtaining statistical properties of the individual tasks of the application to be executed on the electronic system may be based on profiling a run-time workload prediction technique.

A further inventive aspect provides a modeling tool adapted for carrying out a method according to an embodiment of the present invention.

The modeling tool may comprise means for receiving a description of the composition of an electronic system in terms of individual components used; means for receiving distribution of statistical properties of the performance of the individual components with respect to first and second performance variables, e.g. energy and delay; means for receiving information about execution of an application on the system; and a calculating means for automatically determining system-level yield of the electronic system, by manipulation of the probability density functions of the statistical properties of the performance of the individual components with respect to first and second performance variables. Automatically determining system-level yield by manipulation of the probability density functions of the statistical properties means that no simulation is carried out.

The calculating means may be adapted for taking into account reconfigurability of the individual components. This reconfigurability may be run-time reconfigurability. The individual components may be bivariate, i.e. having two variables such as e.g. energy and delay.

Another inventive aspect provides a system-level simulator for evaluating performance of an electronic system comprising individual components subject to manufacturing process variability leading to manufacturing defects. The simulator comprises input means for receiving a description of the composition of the electronic system in terms of which individual components are used; input means for receiving statistical properties of the individual components of the electronic system with respect to performance, e.g. indicated by energy and delay; input means for receiving information about execution of an application on the system; and an evaluator for evaluating the performance of the system based on the statistical properties of the performance distribution of the individual components, taking into account the application information.

One inventive aspect also provides a computer program product for executing a method according to an embodiment of the present invention when executed on a computing device associated with a system-level simulator.

A machine readable data storage storing the computer program product according to embodiments of the present invention is also provided. The terms "machine readable data storage" or "carrier medium" or "computer readable medium" as used herein refer to any medium that participates in providing instructions to a processor for execution. Such a medium may take many forms, including but not limited to, non-volatile media, volatile media, and transmission media. Non-volatile media includes, for example, optical or magnetic disks, such as a storage device which is part of mass storage. Volatile media includes dynamic memory such as RAM. Common forms of computer readable media include, for example a floppy disk, a flexible disk, a hard disk, magnetic tape, or any other magnetic medium, a CD-ROM, any other optical medium, punch cards, paper tapes, any other physical medium with patterns of holes, a RAM, a PROM, an EPROM, a FLASH-EPROM, any other memory chip or cartridge, a carrier wave as described hereafter, or any other medium from which a computer can read.

Various forms of computer readable media may be involved in carrying one or more sequences of one or more instructions to a processor for execution. For example, the instructions may initially be carried on a magnetic disk of a remote computer. The remote computer can load the instructions into its dynamic memory and send the instructions over a telephone line using a modem. A modem local to the computer system can receive the data on the telephone line and use an infrared transmitter to convert the data to an infrared signal. An infrared detector coupled to a bus can receive the data carried in the infra-red signal and place the data on the bus.

The bus carries data to main memory, from which a processor retrieves and executes the instructions. The instructions received by main memory may optionally be stored on a storage device either before or after execution by a processor. The instructions can also be transmitted via a carrier wave in a network, such as a LAN, a WAN or the internet. Transmission media can take the form of acoustic or light waves, such as those generated during radio wave and infrared data communications. Transmission media include coaxial cables, copper wire and fiber optics, including the wires that form a bus within a computer. One inventive aspect thus provides transmission of the computer program product according to embodiments of the present invention over a local or wide area telecommunications network.

A further inventive aspect provides transmission over a local or wide area telecommunications network of results of a method implemented by a computer program product according to embodiments of the present invention and executed on a computing device associated with a system-level simulator. Here again, the results can be transmitted via a carrier wave in a network, such as a LAN, a WAN or the internet. Transmission media can take the form of acoustic or light waves, such as those generated during radio wave and infrared data communications. Transmission media include coaxial cables, copper wire and fiber optics, including the wires that form a bus within a computer. One inventive aspect thus provides transmission of the results of methods according to embodiments of the present invention over a local or wide area telecommunications network.

In an embodiment of the invention the technique to estimate the system level yield loss is demonstrated for a number of alternative memory organization implementations, aiding the designer into making educated trade-offs at the architecture level between energy consumption and yield by using memories from different available libraries with different performance characteristics, e.g. energy/delay characteristics, considering the impact of manufacturing variation. The accuracy of this technique is very high. An average error of less than 1% is reported.

It is clear that the method is equally applicable to datapaths.

An embodiment of the invention can be described as a highly accurate method for determining an estimate of system-level yield loss for electronic system, for example to be fabricated in nanotechnology and subject to process variability, in particular those suited for embedded, real-time, power sensitive applications from a system-level, architectural or even application level description of such electronic system, the process variability leading to manufacturing defects, the method comprising the steps of: reading a representation or description of the electronic system; reading in statistical properties of the individual components/IP blocks of the electronic system; propagating the statistical properties of the energy consumption and the performance of the individual components/IP blocks to the electronic system.

In an embodiment at least one of the statistical distributions are non-Gaussian.

In an embodiment the method is adapted for estimating the timing yield of memory organizations that employ configuration options allowing run-time energy/delay trade-offs, in particular using a plurality of bivariate probability density functions and an approach to transform such representation of a plurality of bivariate probability density functions, one for each configuration, into another representation comprising a plurality of bivariate probability density functions, which takes into account a timing constraint.

The proposed method for estimating the yield at the system architecture level takes into account the correlations between dynamic energy and delay that exist in the individual architecture components and it can also handle the impact of configurable components on the timing parametric yield and the average and worst-case energy consumption of the system architecture.

It is demonstrated that an intermediate step of projecting probability density functions on the time and energy axes and subsequently perform transformations, related to the energy and timing metric is a suitable approach.

In an embodiment a method for calculating the probability distribution of the delay of an electronic system from the information of its underlying components is demonstrated.

In an embodiment a method for calculating the probability distribution of the energy consumption of an electronic system from the information of its underlying components is demonstrated, in particular an approach using Fourier transforms.

In an embodiment of the invention suited for configurable components first the post-configuration level distributions are determined and then the architecture yield and energy consumption are estimated.

An important metric for the user of an embedded system is whether he or she can watch video, listen to audio or communicate at real-time, i.e. whether a desired application can be performed, and not whether the nominal frequency specifications are met by all the system components. This is valid as long as timing violations do not occur. In embodiments of the present invention a parametric yield metric is proposed that is based on whether the application can meet its real-time deadlines, as opposed to the system components meeting the nominal clock frequency target. This metric is called application yield. It is calculated based on the statistical characterization of the energy and delay behavior of the system components. Such components must be statistically characterized considering the driving (at the primary input) and loading (at the primary output) conditions of the component in the context of the system where it is embedded. This can be done either by knowing a priori the conditions of the system in which such component is embedded and characterizing the component for these or by having the component characterized under a multiplicity of (input) driving and (output) loading conditions; selecting these conditions closest to the final context where such component is embedded and/or assuming linear and/or non-linear interpolation of the parameters affected.

This application yield metric allows a designer to make exploration choices. If the system has a configuration parameter that can be changed at run-time and that alters the performance of the system components or the synchronization intervals (e.g. clock period), a proper steering of this parameter can enhance the application yield and this effect can be captured by the proposed metric. In embodiments of the present invention, a technique to enhance the parametric yield of battery-operated real-time embedded systems by exploiting Dynamic Frequency Scaling (DFS) techniques is described. DFS is a technique whereby, at run-time, the clock frequency of a multi-clock architecture is changed in order to slow down the execution of the system, therefore reducing the energy consumption of the device, while still ensuring timely handling of an application. Removing the assumption of the constant clock cycle enables a re-distribution of the available time among the different tasks by varying their clock frequencies. The optimal clock frequency calculation can be steered by the post-fabrication performance of the system components, such that a slow component is not forced to operate under a fast clock. Similarly if all the components are faster than the nominal clock frequency, the operating frequency can be increased. Such a yield-aware DFS strategy can ultimately lead to an improvement in the timing parametric yield of the system without a change in the system components, the application or the mapping.

Information about the post-fabrication statistical properties of the performance, e.g. delay and energy consumption, of the system components may be used during the design phase of the system. This information can be obtained from statistical estimation, Monte-Carlo simulations or measurements. Statistical information regarding the execution of the applications on the platform, based on profiling or a run-time workload prediction technique for instance, may also be used. In embedded systems this information is always available for the application designer. Furthermore, means to measure the actual performance of each component after fabrication may also be used. This can be done via off-chip or on-chip measurement of the delay of the main blocks of the system, e.g. during the manufacturing test phase or during a BIST run, e.g. for on-chip memories.

In order to evaluate the impact of a yield-aware DFS technique, a methodology and an analytical framework are provided to accurately estimate early in the design cycle the energy and timing application parametric yield of a system comprising an embedded real-time application running on a given platform. Larger gains can thus be achieved than with yield enhancement techniques at the physical planning or physical design level, due to the larger scope and impact that the choices have at the higher abstraction levels, such as system level design. This parametric yield estimation can take into account the impact of optimization techniques which adapt the system operation to account for process variability impact or changing application deadlines as long as they can be statistically characterized. This analysis can give system designers long before fabrication information such as how many samples will meet a given timing constraint or what timing and energy constraints can the system meet for 99% yield.

Certain inventive aspects propose a parametric yield formulation and metric that is based not on whether the circuit meets the nominal clock frequency requirements, but on whether the application running on the system can meet its deadlines. Moreover, by providing analytical formulae that can link energy consumption and application level timing the yield loss at the application level can be predicted under constraints on both the application deadline and the overall energy consumption.

In accordance with embodiments of the present invention, both parametric system-yield determination and parametric application-yield determination can be combined.

Particular and preferred aspects of the invention are set out in the accompanying independent and dependent claims. Features from the dependent claims may be combined with features of the independent claims and with features of other dependent claims as appropriate and not merely as explicitly set out in the claims.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

Once the memory level distributions, i.e. PDF of the individual components, are obtained, the memory organization level, i.e. system level, timing and energy distributions can be obtained. The delay of the memory organization is actually the maximum of the delays of all the memories it comprises and the energy consumption is a weighted sum of the energy consumption of each individual memory. The weights are the number of accesses that are performed to each memory.

Figure 5:
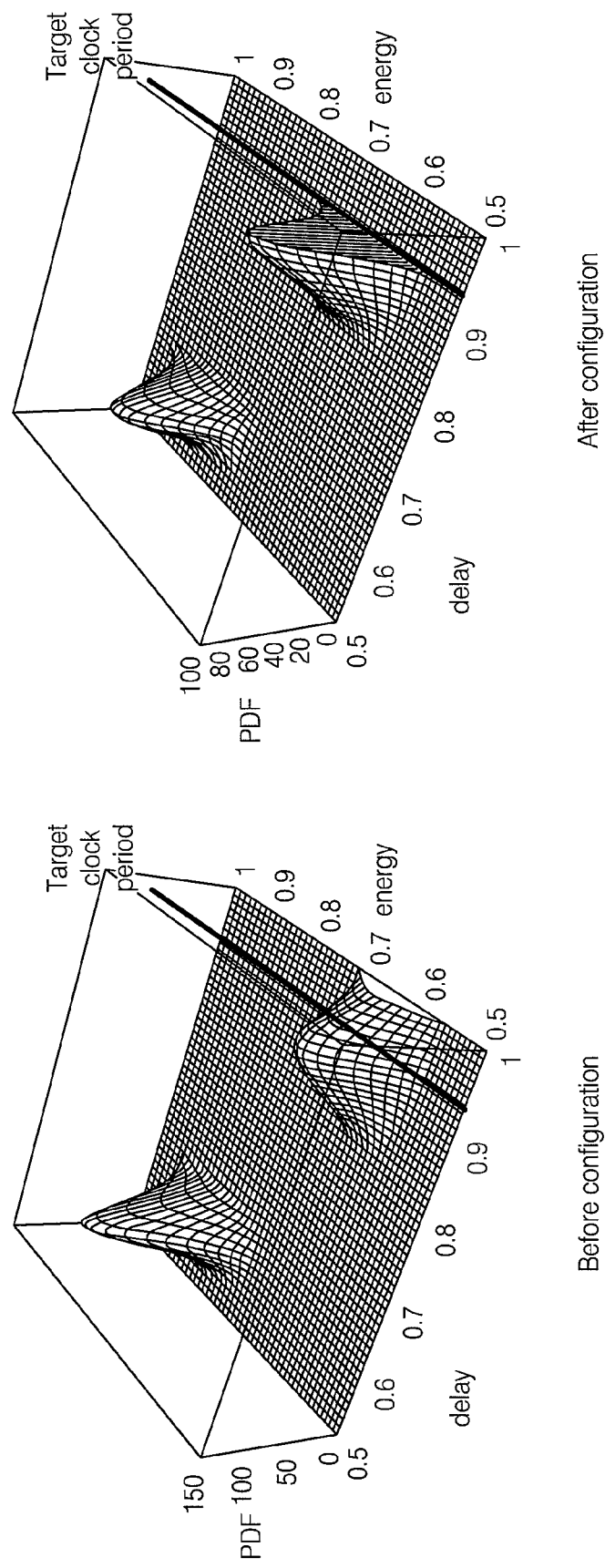

FIG. 5. Illustration of the bivariate energy/delay probability density functions of a 1 KByte memory due to process variability on the process front-end-of-line before and after the configuration for a target clock period of 0.93 ps.

Figure 6:
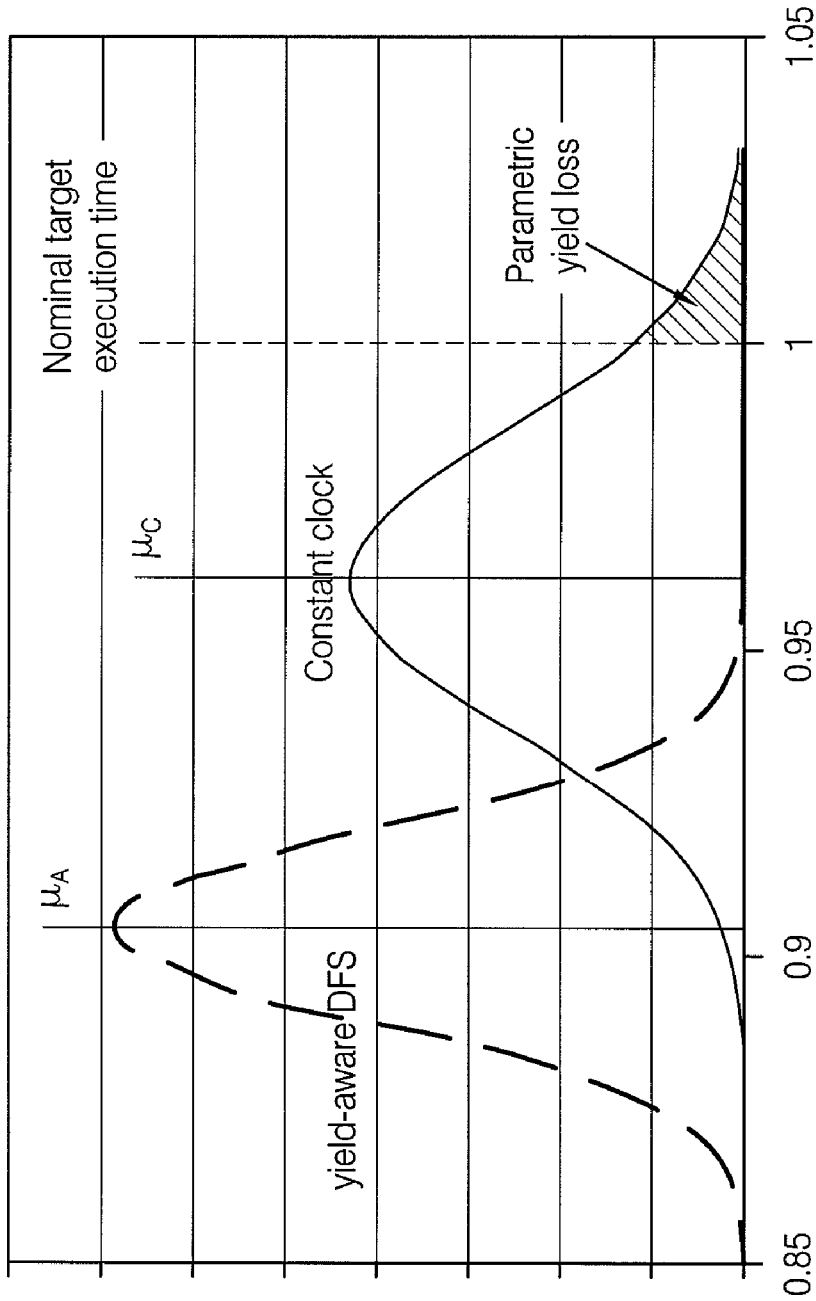

FIG. 6. The probability density functions of the execution time of a system running on a constant clock frequency and a system using a yield-aware DFS technique in accordance with embodiments of the present invention. The system of which the PDF is illustrated is, as an example, running a wireless receiver application.

Figure 7:
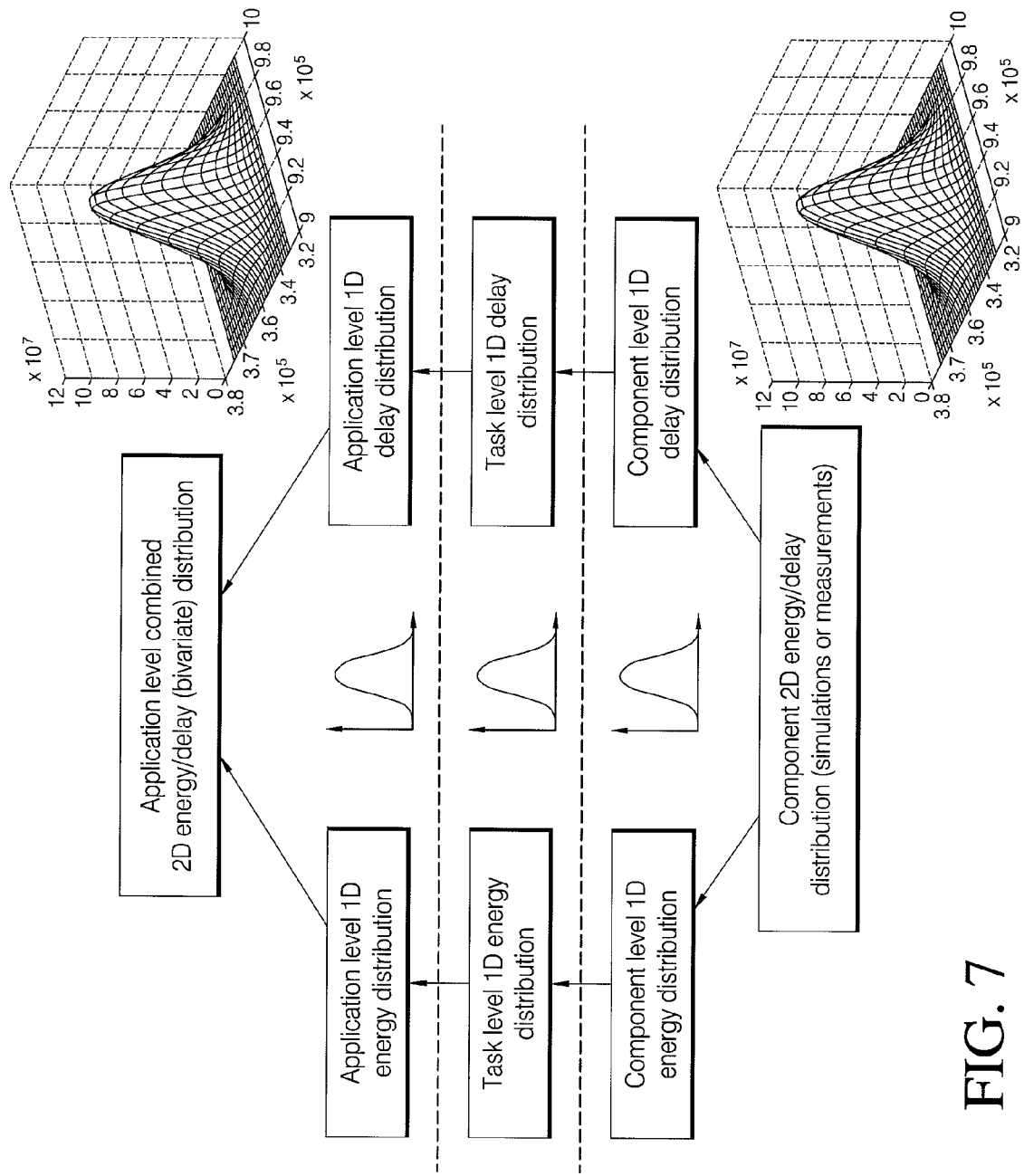

FIG. 7. The used flow to go from the component level parametric yield to higher abstraction levels in accordance with embodiments of the present invention. The component level bivariate distribution is split, the uni-dimensional distributions are propagated up to the application level and combined there into the application energy/timing bivariate distribution.

Figure 8:
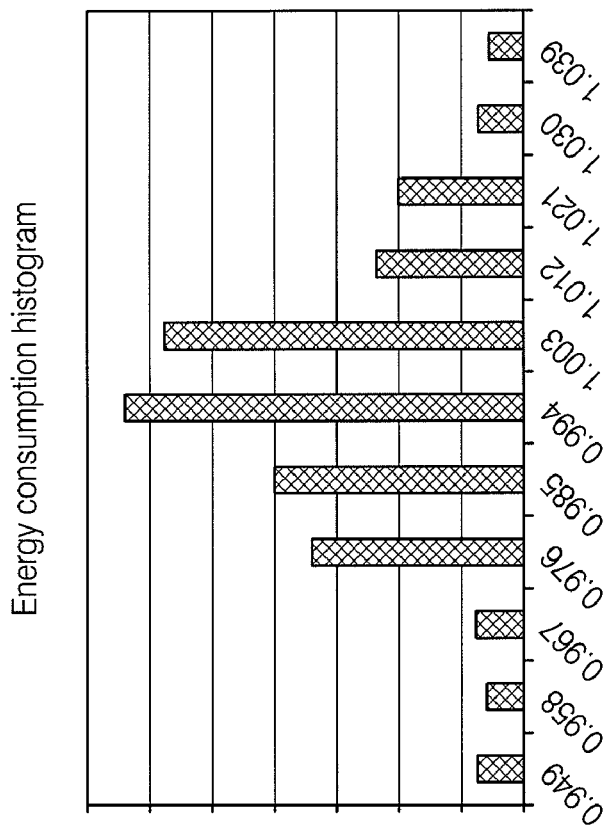
Figure 8:
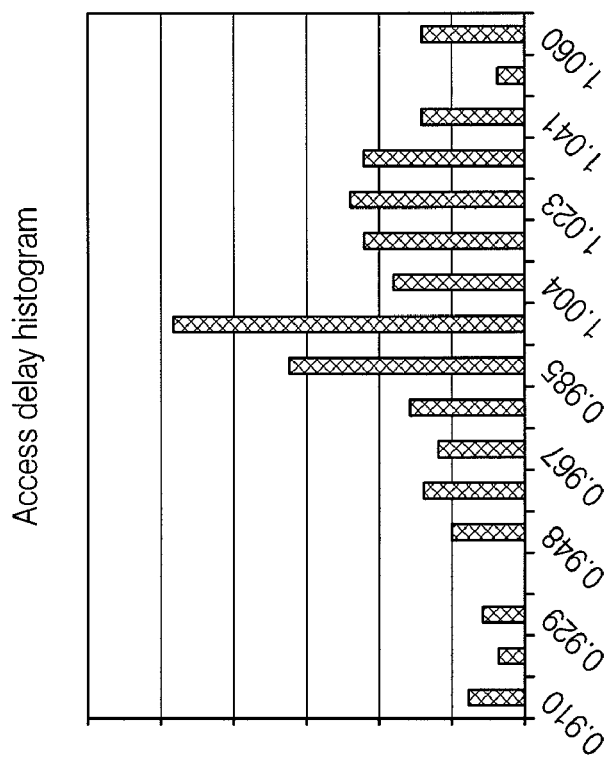

FIG. 8. The access delay and energy per access histograms normalized to the mean value for a 1 KByte memory at the 65 nm technology node.

Figure 9:
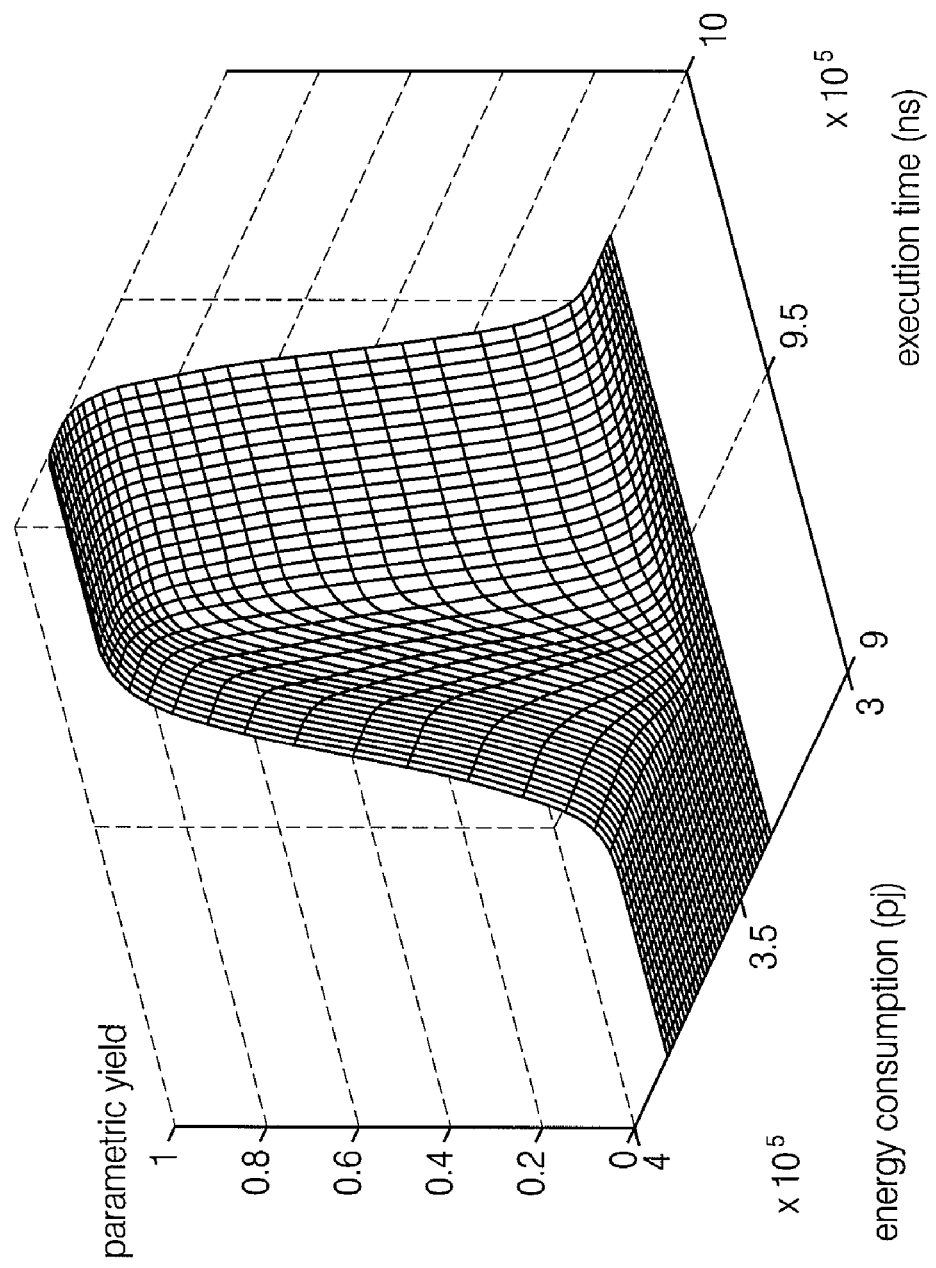

FIG. 9. The two-dimensional energy/delay parametric yield surface of a wireless receiver application running on a platform with the highest supply voltage and frequency is shown. Cutting this surface for a given timing or energy results in the energy or timing parametric yield respectively.

Figure 10:
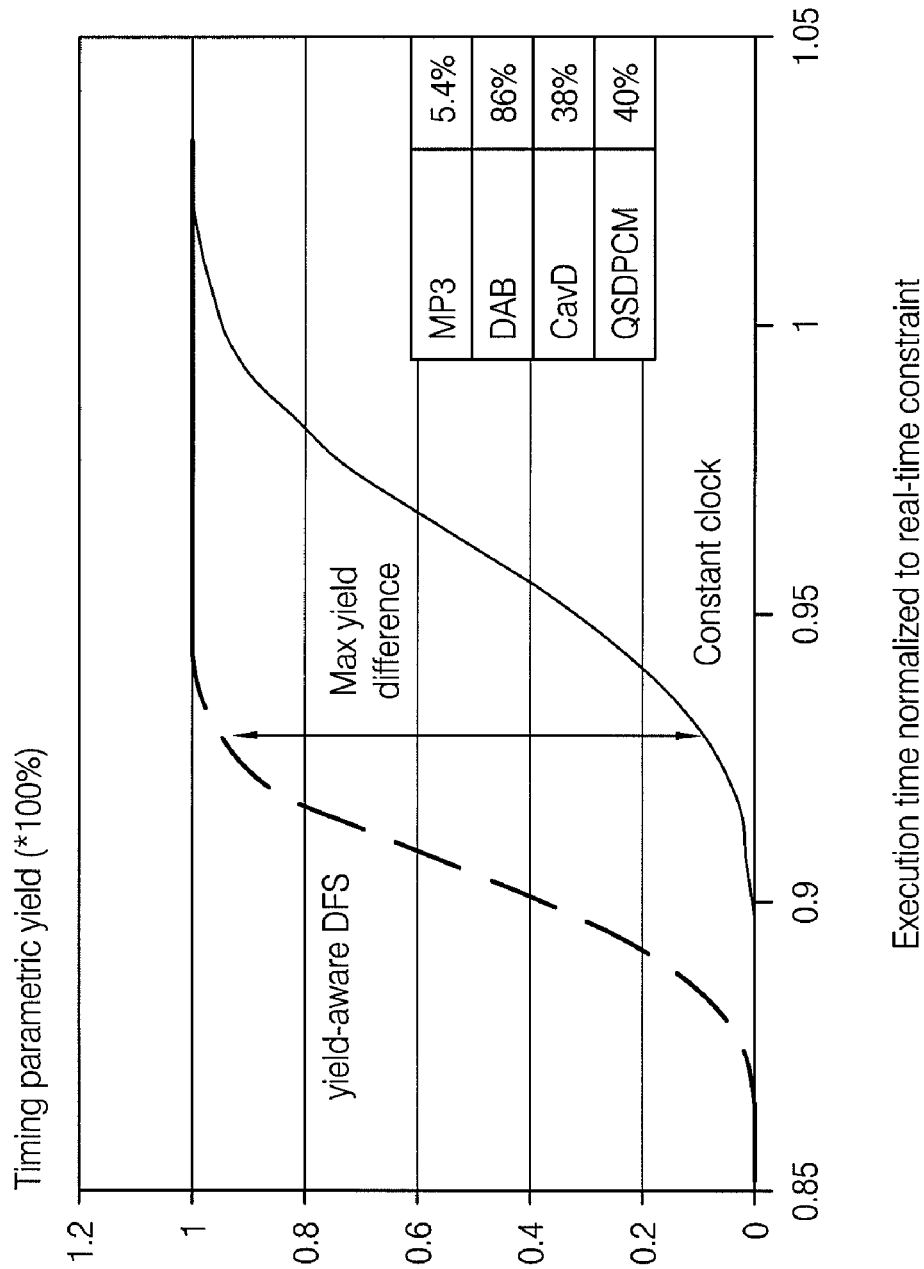

FIG. 10. Comparison of the timing parametric yield using a constant clock and yield-aware DFS in accordance with embodiments of the present invention, for a DAB application. The embedded table shows the maximum yield gains for 4 applications: MP3 decoder, Digital Audio Broadcast (DAB), Cavity Detection (CavD), Quadtree Structured Difference Pulse Code Modulation (QSDPCM).

Figure 11:
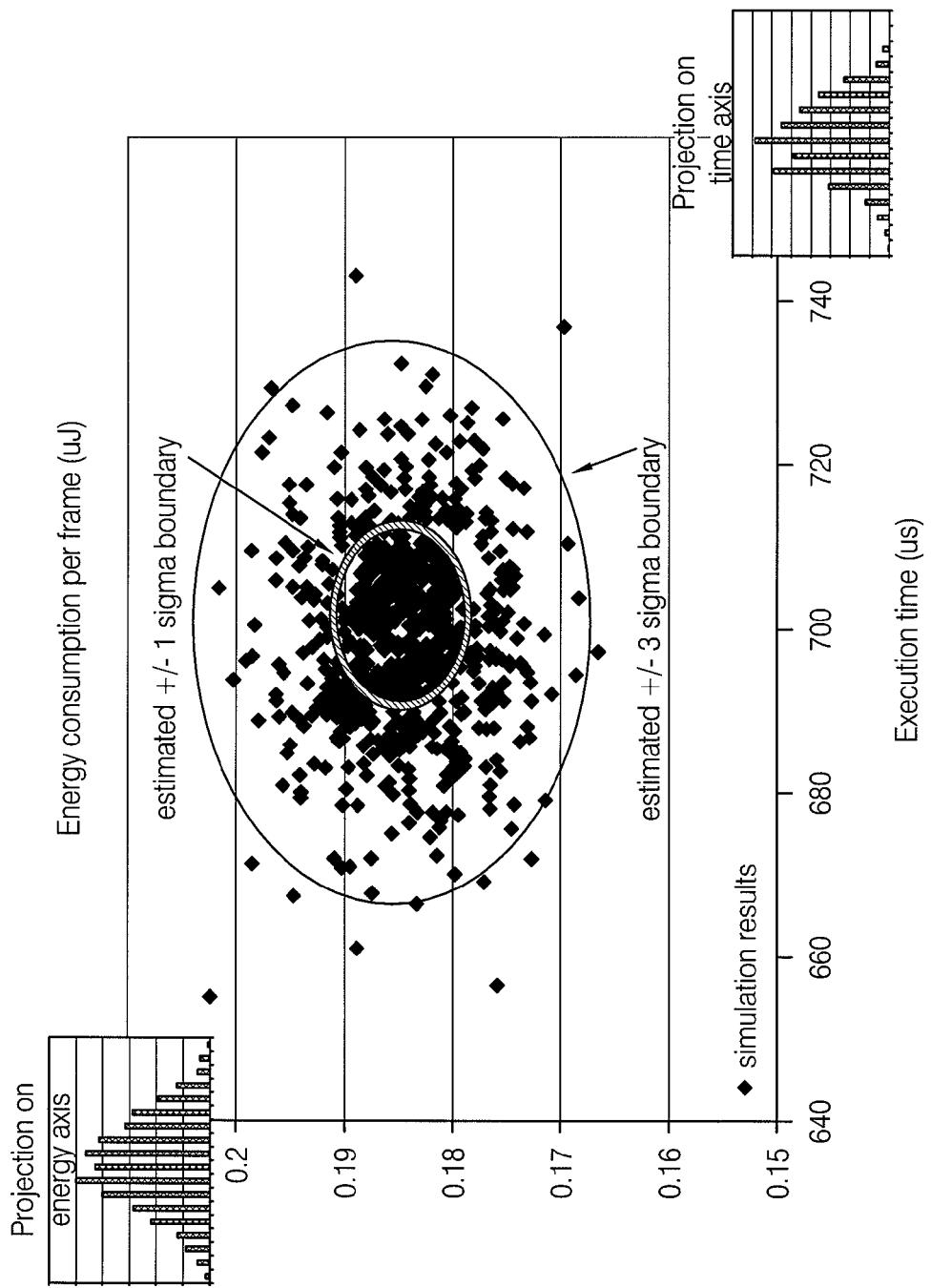

FIG. 11. The +/−1 and 3 sigma boundaries of the analytically calculated distributions are shown against the Monte Carlo simulation results. The simulated points match the estimated behavior rather well, very few extreme points exist outside the +/−3 sigma boundary. The histograms of the points projected to the energy and the execution time axes are also shown.

Figure 12:
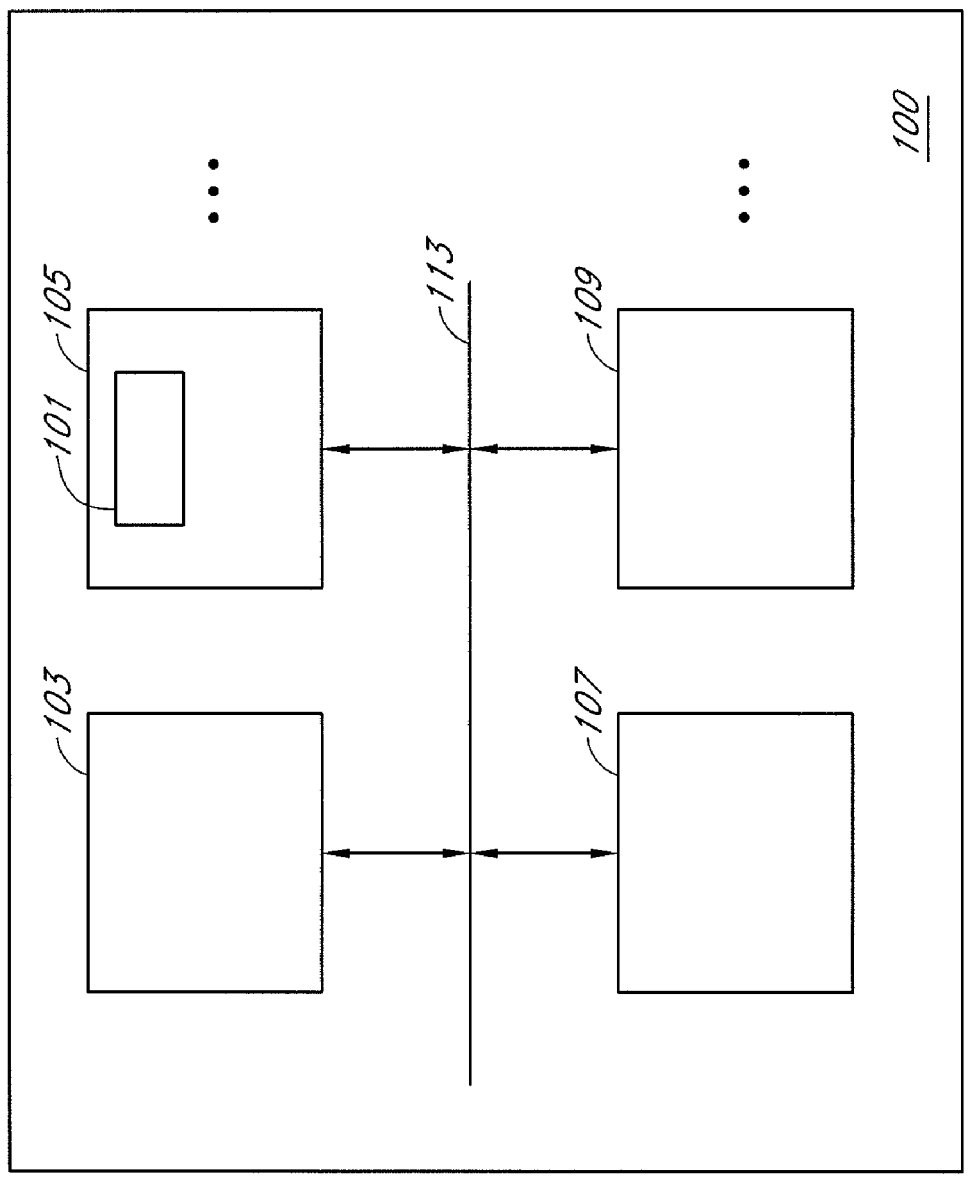

FIG. 12 illustrates a processing system which may be used for executing a method in accordance with embodiments of the present invention.

Figure 13:
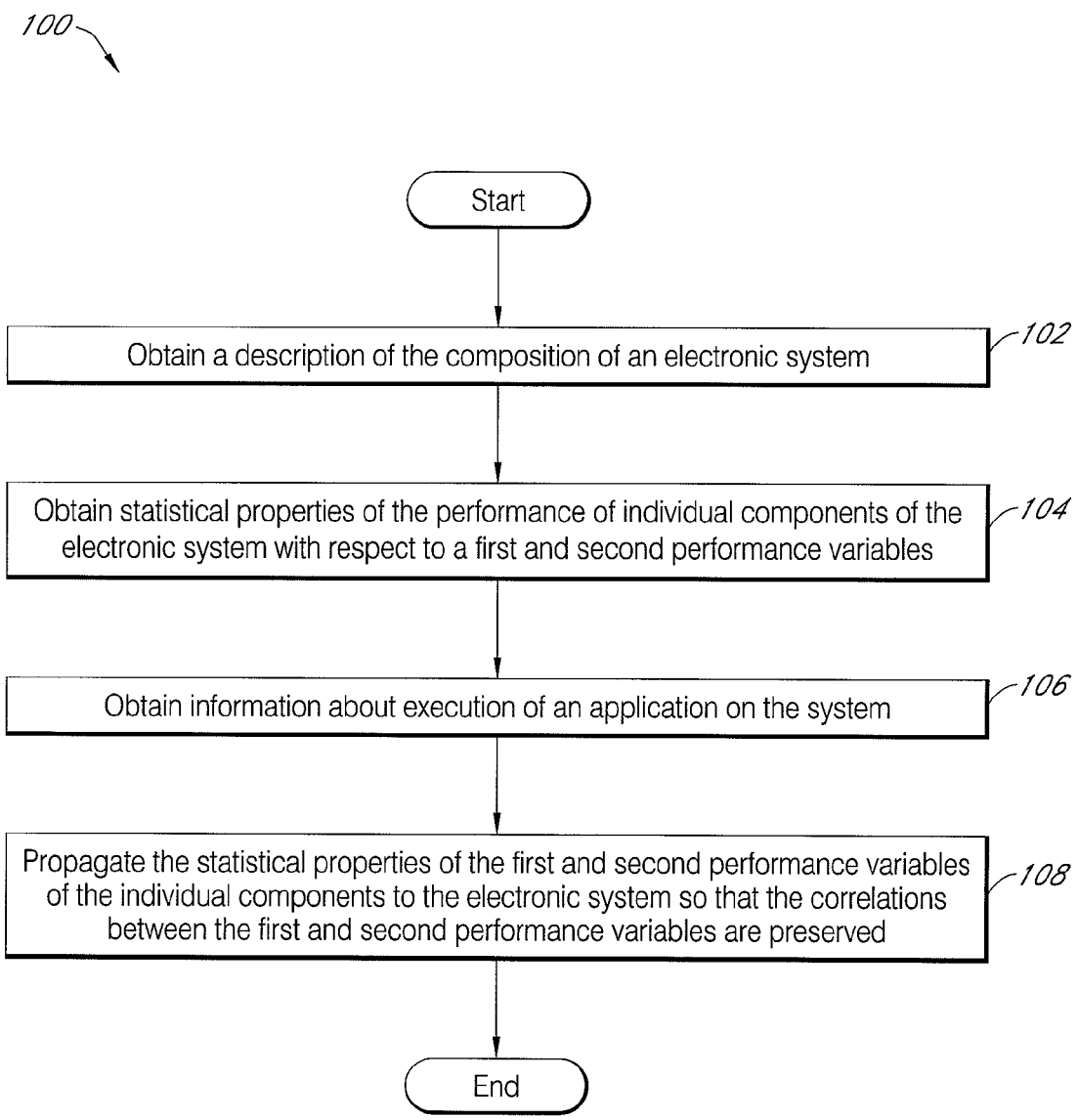

FIG. 13 shows a flowchart of one embodiment of a method of determining an estimate of system-level yield loss for an electronic system.

Figure 14:
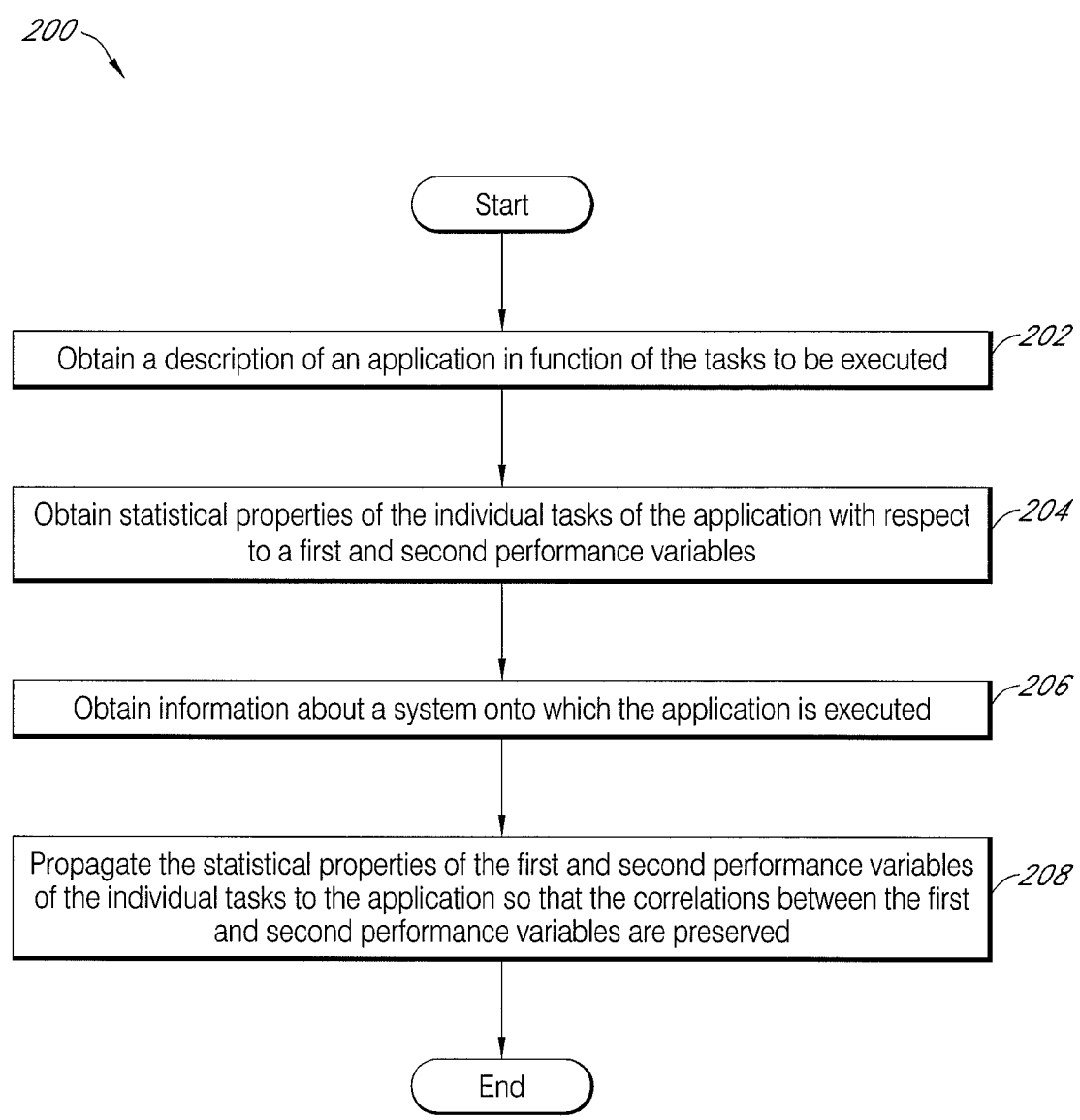

FIG. 14 shows a flowchart of one embodiment of a method of determining an estimate of system-level yield loss for an application.

Figure 15:
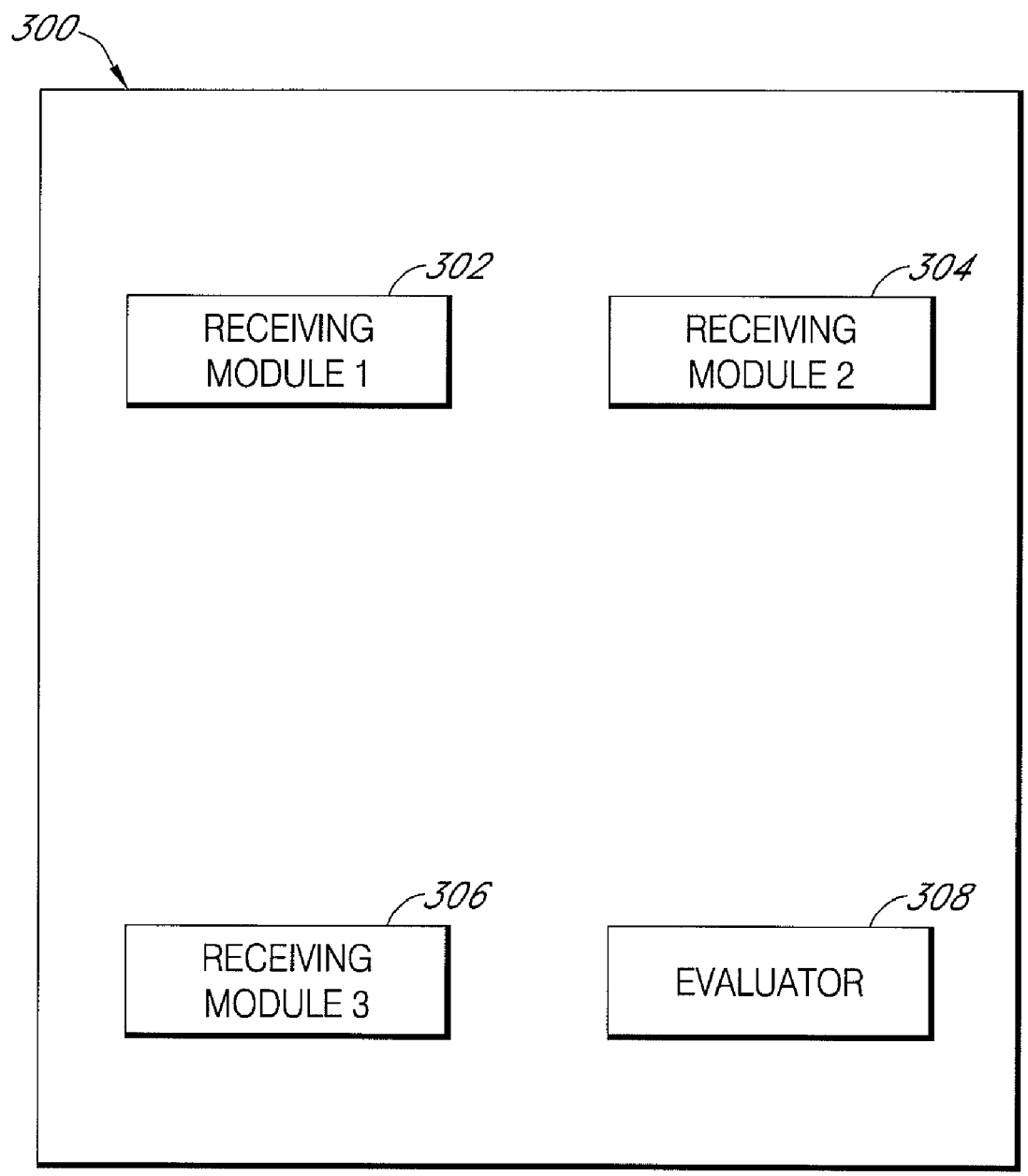

FIG. 15 shows a block diagram illustrating one embodiment of a system-level simulator for evaluating performance of an electronic system.

DETAILED DESCRIPTION OF CERTAIN EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising" should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Similarly, it is to be noticed that the term "coupled" should not be interpreted as being restricted to direct connections only. The terms "coupled" and "connected", along with their derivatives, may be used. It should be understood that these terms are not intended as synonyms for each other. Thus, the scope of the expression "a device A coupled to a device B" should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

The invention will now be described by a detailed description of several embodiments of the invention. It is clear that other embodiments of the invention can be configured according to the knowledge of persons skilled in the art without departing from the true spirit or technical teaching of the invention, the invention being limited only by the terms of the appended claims.

As mentioned before, two types of yield exist. Functional yield represents whether the system is functionally correct and parametric yield represented whether it meets the performance requirements, e.g. delay/energy requirements. On the other hand, both types of yield can be defined at different levels of abstraction, at the level of circuit, system component (e.g. functional unit or memory) or at the entire system level. A direct impact exists between the yield at different abstraction levels. If a system component, a memory for instance, has a functional yield of 50%, then at least 50% of the systems will not function properly due to that one non-functional memory. As a result, functional yield at the lower levels can be translated into functional yield at the higher levels. Moreover, if it is assumed that the same component has a parametric timing yield of 50%, it means that half of the functional memories will not meet the nominal specification for the clock period. This produces timing violations which result in incorrect operations at the system level, thus it can be translated into functional yield at the system level, because the input output behavior of the system is not the correct one. Thus, even if all the other system components were fully functional and meeting the specifications, the system would have, in case of the example given, a yield of 25%, due to that single faulty component.

For a system running on a temporally constant clock frequency the yield of the system can be calculated as:

$$Y_s = \prod_{i \in components} Y_c^i,$$

where $Y_s$ is the yield at the system level and $Y_c^i$ is the component level yield of component i. For such a system with a constant clock frequency, the system level functional and parametric yield are the same, since timing violations directly affect the functionality of the system.

Process variability, on the other hand, severely impacts the performance characteristics of the system components. Even though individual transistors might become faster or slower, the impact on large components like memories and processors is almost always negative due to their structure, as described by C. Viswewariah in "Death, taxes and failing chips", Design Automation Conference, pp. 343, 2003, and by M. Mani et al. in "An efficient algorithm for statistical minimization of total power under timing yield constraints", Design Automation Conference, 2005, making the components slower. This performance degradation can be statistically characterized for each system component via simulations or measurements, but the exact impact on the performance of each component cannot be predicted at design-time. Hence, the operating clock frequency should always be relaxed enough so that the slowest component can operate, which results in the introduction of worst-case safety margins. This, however, means that most of the system components will be faster and will be idle for part of the clock cycle.

Instead of adding these margins and determining the maximum achievable clock frequency that results in functionally correct operation (frequency binning), the performance of each individual component can be measured after fabrication. Using this information, the clock frequency can be dynamically tuned at run-time to be fast enough for the slowest component that is used during the specific timing interval. If some components are not used, i.e. interfaces to external modules or idle functional units, they would not impose constraints on the clock frequency. The utilization of the various system components depends on the application and its mapping on the platform, so this tuning is application dependent. The frequency could then be fine-tuned per task, for instance, so that timing violations at the clock cycle level from the components utilized during this task are eliminated. Thus, parametric yield at the component level would not manifest itself as functional yield at the system level, but as parametric yield in the form of missed application deadlines in case the actual component performance is much degraded due to variability. This frequency tuning technique is called yield-aware DFS. An application of this technique has been illustrated by H. Wang et al. in "Impact of deep submicron (DSM) process variation effects in SRAM design", Design, Automation and Test in Europe, 2005, which is incorporated herein by reference. It has two main differences compared to conventional DFS techniques. The first is that it estimates the optimal frequency taking into account only the components that are actually performing useful functions during the execution of the given task. The second difference is that it can increase the clock frequency past the nominal frequency target if the used system components are fast enough. The alleviation of the worst-case safety margins means that the total execution time of any application running on a platform using yield-aware DFS will be faster, or equal in the worst case, to the execution time on a conventional system.

The minimum clock period per task should be equal to the maximum critical path of the system components that are used during the execution of the given task, not the maximum delay of all the components of the system. This can from a very conceptual viewpoint be seen as a run-time task-level binning technique, where the maximum operating frequency for each task is determined based on the performance of the used components. For instance, if one memory is slower than the target clock period required to meet the application deadline, then the tasks using that memory will have to run at a slower clock frequency. The remaining tasks, however, may be able to run at a higher frequency and eventually make up for the time lost due to the slow component. Hence, the assignment of the "bins" in this case happens fully dynamically based on the run-time conditions. Clearly, the total execution time of the application using this approach will be smaller than the execution time using conventional frequency binning. The latter is actually the upper bound of the former.

FIG. 6 illustrates the difference in execution time between a prior art method with constant clock and yield-aware DFS in accordance with embodiments of the present invention for a wireless receiver application using the frequency scaling policy of H. Wang et al. described in "Impact of deep submicron (DSM) process variation effects in SRAM design", Design, Automation and Test in Europe, 2005. The time is represented as probability density functions due to the impact of process variability on the performance of the system components. Samples that are slower than the target execution time are yield loss, so designers insert design margins to speed up the designs and thus to shift the entire distribution to the left. However, this speed up has a cost in energy consumption. The left hand PDF is the distribution of the execution times of systems using DFS for yield. Without any change to the application, the memory organization or the application mapping, the total execution time can be reduced and more importantly, it can be made more predictable. However, the conventional yield metrics cannot capture this gain. Using the novel yield metric and the methodology according to embodiments of the present invention to predict this gain at design-time, designers can reduce the design margins they introduce in the circuits.

Furthermore, including information about the workload of the system and a configuration parameter results in a global approach that maximizes parametric yield and minimizes energy consumption. An example of such an approach which focuses on the memory organizations of real-time embedded systems is presented by H. Wang, M. Miranda, W. Dehaene, F. Catthoor, K. Maex in "Impact of deep submicron (DSM) process variation effects in SRAM design", Design, Automation and Test in Europe, 2005. The on-chip memories offer a configuration parameter so they can be configured in one of two states at run-time, a slow energy-efficient or a fast energy-hungry state and the performance of each memory is measured at run-time, hence the relation between component performance and energy consumption is established after fabrication. At run-time, a controller calculates the optimal clock frequency per task such that all the memories involved in the respective task can operate, the application deadline is met and the energy consumed is minimal. This calculation additionally takes into account the application deadline and information about how the application uses the various resources. This approach is used to illustrate the potential of using frequency scaling for yield enhancement.

By removing the assumption about a constant clock frequency for all components, the application execution can be speeded up and as a result the timing parametric yield may be increased. The fundamental difference of the approach according to embodiments of the present invention compared to existing techniques is that the timing reference is not the clock cycle, but the application deadline. The system is not designed to meet a target clock cycle, but a target application deadline, which gives more freedom to the global controller to re-distribute the available time to the various tasks. This method works optimally in the case of (heavily) distributed systems, because the distribution of the resources enables the global controller to work around pathologically slow components. It also has a limited impact on centralized systems, however.

From the above it is clear that conventional yield metrics cannot evaluate the parametric yield of such run-time self-adapting systems. The parametric yield at the system component level cannot be defined, due to the lack of a constant clock cycle which serves as a timing reference. The system parametric yield cannot be evaluated at the clock cycle level, it needs to be evaluated at the level of application deadline. In accordance with embodiments of the present invention, a parametric yield metric is provided, called application yield, which can evaluate how many such systems can meet the nominal application deadlines, given information about the post-fabrication performance of the components and the expected system workload.

The main assumption used is that the components never have parametric yield loss, which means that the clock period is always larger than the critical path delay of the slowest component that is used at any moment in time. This novel metric can evaluate the impact of yield-aware DFS and similar techniques on the performance of the system taking into account the application and mapping impact.

While the prior-art solutions are based on feedback on an existing design, e.g. acting when wrong operations are detected and/or deviations from design specs are measured on the system itself, one embodiment provides methods for estimation of yield loss, prior to the actual manufacturing of the electronic system.

The use of methods according to embodiments of the present invention results in trade-offs on the main system metrics as noted above, e.g. energy consumption and delay, as a function of the yield is provided. Therefore, such methods and tools incorporating such methods allow to reason in terms of trade-offs between yield, energy, performance (delay) and area at the architecture level, and are particularly useful for successful embedded system design at the nanometer technology node, e.g. 90 nm technology node and beyond, for example 65 nm technology node and beyond.

In accordance with embodiments of the present invention, statistical properties of the individual components of an electronic system with respect to first and second performance variables, e.g. energy/delay distributions, are a priori characterized, e.g. in the process of the target foundry. Obviously, the more accurate the characterization is, the better the estimation results will match reality. This characterization is performed even today by IP developers and the results are only made available to the designers inside IDM companies [C. Visweswariah, "Statistical Timing of Digital Integrated Circuits" Microprocessor Circuit Design Forum at ISSCC 2004.].

Embodiments of the present invention provide a technique to estimate system level yield with regard to a first or second performance variables, and the corresponding values for the second or first performance variables, respectively. Embodiments of the invention provide a technique to estimate the system level timing yield and the energy consumption. Other embodiments of the invention provide a technique to estimate the system level energy consumption yield and the corresponding delay. These methods take into account random variations in processing, such as e.g. doping fluctuations and line edge roughness that lead to spatially uncorrelated drifts in the electrical characteristics of the devices.

In an embodiment of the present invention, the level-1 (L1) data memory organization of an electronic system is considered, because it becomes an energy/delay critical subsystem for a reasonable mapping of the architecture. Memories belonging to the second layer of the memory hierarchy or above typically have more relaxed constraints on their performance requirements, larger cycle times, and they do not contribute significantly to the system yield loss, which is dominated by the tight cycle time of the processing elements and the level-1 memories, but the method is equally applicable to these. Memories of the first level, however, need to respond in a single cycle and the impact of process variability on their performance can severely compromise the yield of the memory organization. Furthermore, typical L1 memory organizations are heavily distributed due to the low-power operation requirements of the applications run on the devices. The increased number of memories increases the probability of timing violations reducing the system level yield.

The technique presented with respect to embodiments of the present invention is based on propagating the statistical properties of the energy consumption and the performance, e.g. delay, of individual components, e.g. individual memories, to an electronic system, e.g. a memory organization. Moreover, it is not limited to Gaussian statistical distributions for the individual components, e.g. memories. It can handle any type of distribution, which is a major assumption in most of the state of the art for single gates. For complex IP (Internet Protocol) blocks that assumption is no longer valid. Furthermore, one of the major advantages of a technique according to embodiments of the present invention is that it can also estimate the timing yield of electronic systems, e.g. memory organizations, that employ configuration options allowing run-time energy/delay trade-offs [A. Papanikolaou et al., "A System-Level Methodology for Fully Compensating Process Variability Impact of Memory Organizations in Periodic Applications", Intl. Conference on HW/SW Co-design and System Synthesis (CODES+ISSS), September 2005].

Figure 2:
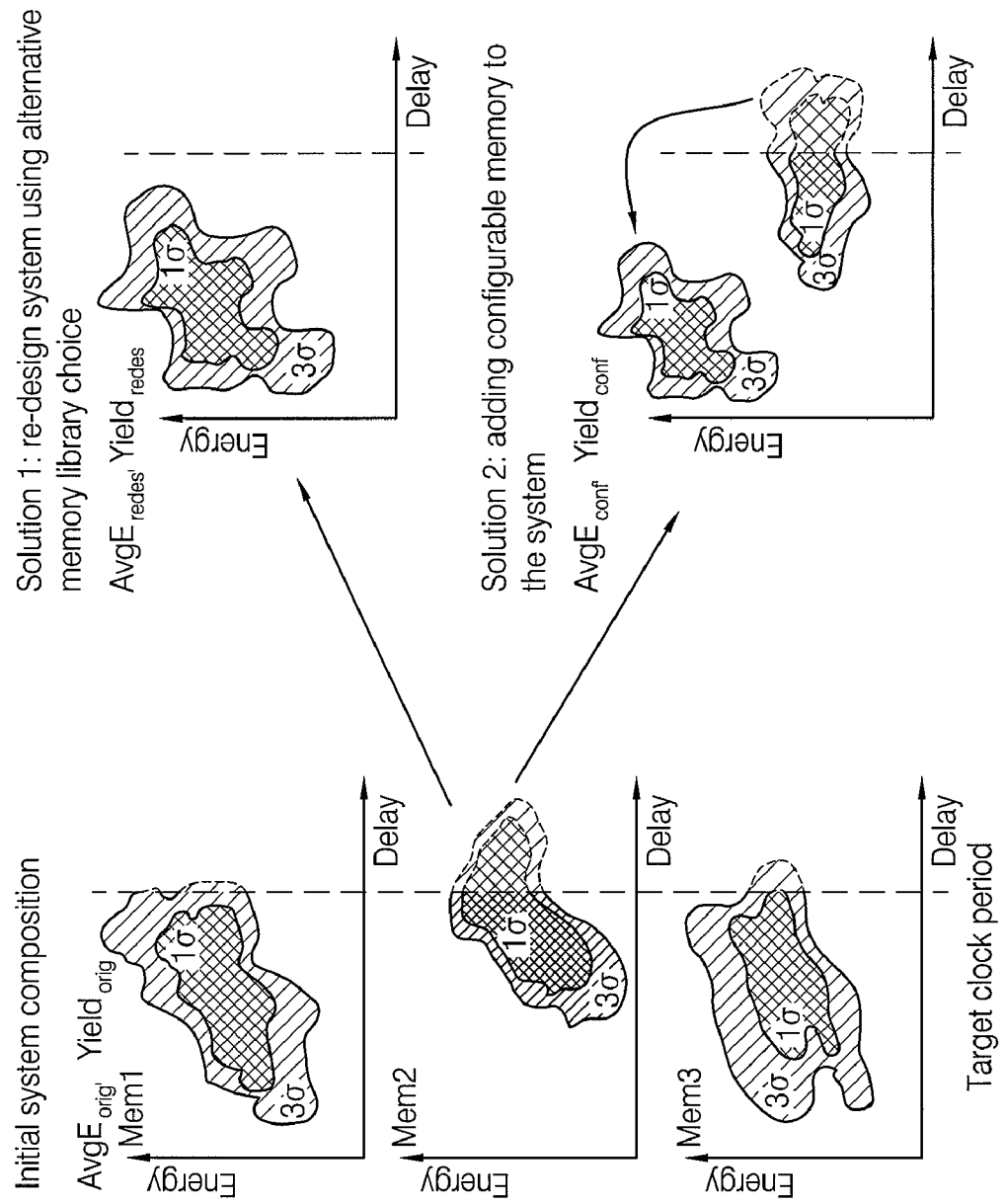
FIG. 2. The initial composition of a memory organization is shown on the left hand side. The middle memory clearly creates a lot of yield loss, due to the high probability of timing violations. Substituting it with a similar but faster memory (right top) decreases the probability of timing violations, but incurs a significant energy overhead. Substituting it with a configurable memory (bottom right) decreases timing violations, with a much lower penalty in energy.

Assume that an electronic system, e.g. a memory organization, comprises three individual components, e.g. memories (e.g. an instruction cache, a data cache and a scratchpad). Memory libraries nowadays allow the choice of high-speed or low-power memories. Since energy consumption is an important cost metric for embedded systems, memories from a low-energy library are chosen for use. Their timing and the energy consumption is described by two-dimensional statistical distributions. These distributions, shown as clouds in FIG. 2 represent the possible energy/delay characteristics and their probability (third dimension, illustrated by the different grey values in FIG. 2) over a large number of fabricated chips of each memory. On the other hand, the designer of the system has a constraint on the target clock period (dashed line) that the fabricated system should meet. The left hand of the figure shows the timing/energy statistical distributions of the memories and the target clock period. Two contours are illustrated per memory, the inner one ("1σ") surrounds about 63% of the population, while the outer one ("3σ") surrounds about 97%. This means that also a non-negligible proportion of the population lies outside the "3 sigma" ("3σ") contour. If the implementation of a given memory has an actual delay larger than the clock period, it will introduce timing violations in the system and render the given chip non-functional. Given the clock period target illustrated in the figure, it is evident that after fabrication a significant percentage of the manufactured chips will have some memory that violates the clock period. The probability that either the first or the third memory is slower than the constraint exists, and even though it is low it must be quantified and considered. The second memory, however, has a large chance of failing to meet the clock target constraint. This means that the yield of the chip will be low. At this point the system design would need to be assessed in terms of what are the actual energy, performance and yield of the implemented system after manufacturing.

Architecture design alternative solutions, such as distributing further the memory organization by memory splitting [K. Patel et al., "Synthesis of partitioned shared memory architectures for energy-sufficient multi-processor SoC" DATE, 700-701, 2004.] would lead to using smaller hence faster memories with a positive impact on yield but would require a more complex mapping process. A much less disruptive solution could be to use memories that are significantly faster than the clock constraint, so that the probability that they introduce timing violations is very small at the expense of energy overhead. In FIG. 2 this corresponds to substituting the second memory with the one shown in the upper right hand side. The new implementation of the second memory is faster, thus yield is increased, but it also consumes more energy. Thus the designer can decide which cost metric is more important and make the appropriate memory implementation selection on condition a yield prediction tool is available. This trade-off between energy consumption and yield is difficult to quantify without tool support, especially in the case of distributed heterogeneous architectures like those used for embedded system design. Obviously, substituting more memories than one will increase the number of different possible implementations with different yields and energy consumption.

A second solution scenario already introduced recently [A. Papanikolaou et al., "A System-Level Methodology for Fully Compensating Process Variability Impact of Memory Organizations in Periodic Application", Intl. Conference on HW/SW Co-design and System Synthesis (CODES+ISSS), September 2005] to increase the system level yield, e.g. memory organization yield, without sacrificing too much energy is to substitute a slow component, e.g. the slow second memory, with a run-time configurable component, e.g. a runtime configurable memory. Run-time configurable memories, or run-time configurable components in general, have at least two possible settings, high-speed and low-energy [H. Wang, M. Miranda, A. Papanikolaou, F. Catthoor, W. Dehaene, "Variable Tapered Pareto Buffer Design and Implementation Techniques Allowing Run-Time Configuration for Low Power Embedded SRAMs", IEEE Trans. on VLSI, vol 13, iss 10, pp. 1127-1135, October 2005]. For the case of a memory implementation, an embedded delay monitor measures the actual delay of the memory after manufacturing. If the low-energy setting is not fast enough to meet the clock period, then the memory is switched to its high-speed setting. As a result, energy consumption is only sacrificed if the actual memory delay after fabrication is slower than the constraint. This solution will have the same yield as the conventional solution of using only high-speed memories, because the memory has the back-up option of the high-speed setting. But, the average memory organization energy consumption will be somewhere between that of the other two design alternatives, since the configurable memory is not at its high-speed and energy hungry setting for all the chips. Note that this approach is generally applicable to any IP block with a run-time configuration knob, for example $V_{dd}/V_{th}$ tuning in processing elements [A. Srivastava et al, "Concurrent Sizing, Vdd and Vth Assignment for low power design", DATE, 718-719, 2004 or L. Benini et al, "System-level power optimization techniques and tools", ACM Trans. on Design Automation for Embedded Systems, vol. 5, vo. 2, pp. 115-192, April 2000]. For memories, however, $V_{dd}/V_{th}$ tuning is not possible without sacrificing the Signal-to-Noise Margin, hence the stability of the cell would be compromised. Finally, a third cost metric that is very important, mostly for financial reasons, is the area occupation of the design. Introducing a configurable memory implemented using configurable buffers will introduce a small area penalty, typically about 5-15% over the area of the memory depending on its size. Also, different library implementations of the same memory also have very different areas, due to the internal memory design choices. However, estimating area occupation of a design given the area of the components is relatively easy.

Another complication of adding run-time configurable components is the additional design complexity. A feedback loop and monitoring mechanisms need to be added to the design to implement the configuration functionality. In order to find the optimal trade-off for the particular design all these metrics should be considered.

Figure 3:
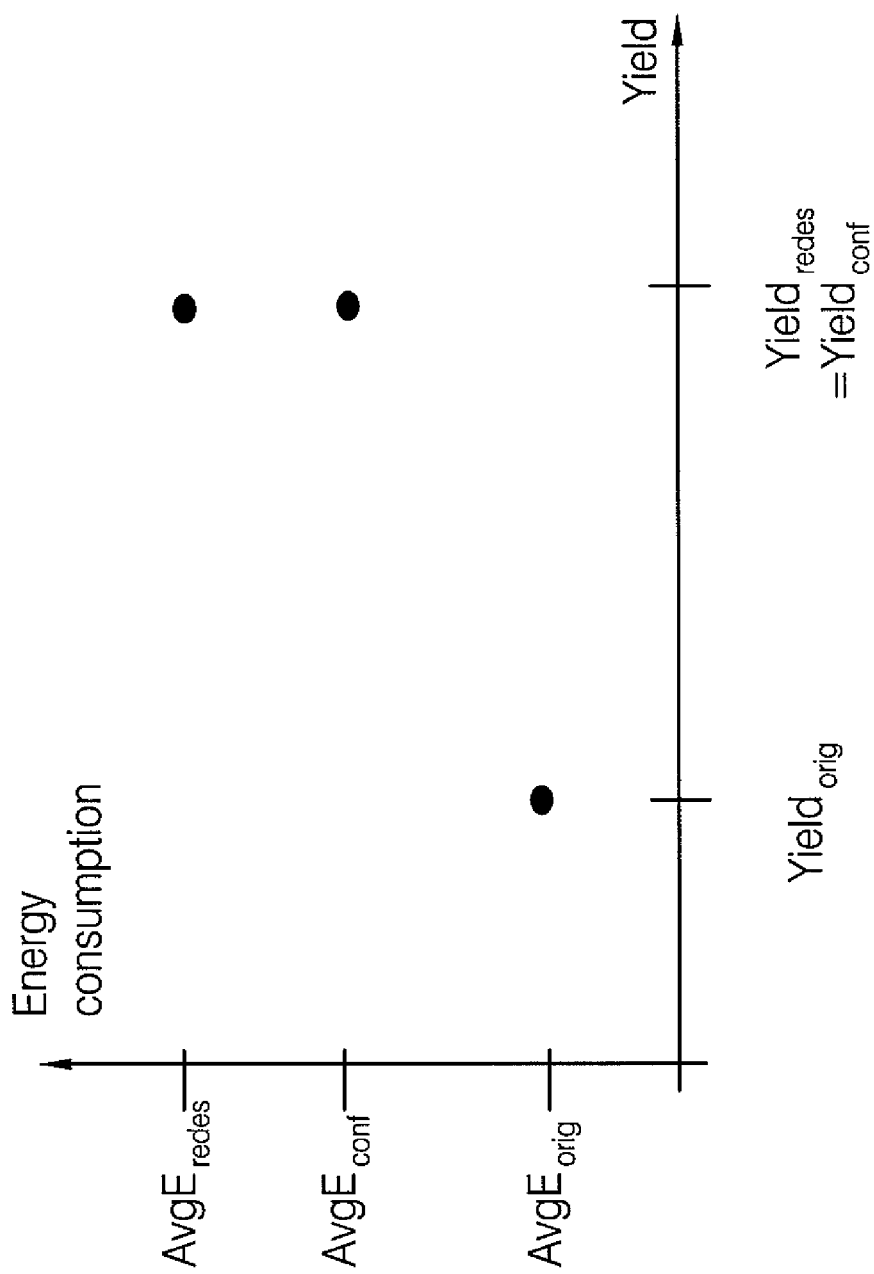
FIG. 3. Conceptual illustration of the trade-offs that exist between yield and energy consumption during architecture exploration of the memory organization as illustrated in FIG. 2.

FIG. 3 illustrates the yield and the average energy consumption of the memory organizations made using the three design approaches shown in FIG. 2. As already explained, the original low-energy design will have a significantly lower yield than the other two. The yield of the other two solutions is approximately the same. However, the organization using configurable memories can have a smaller energy penalty.

It is important to note that in practice, memories from a high-speed memory library are not as fast as configurable memories, which are specially designed to compensate for variability. The reason is that high-speed memories need to embed worst-case timing margins in the design of the memory in order to maximize their functional yield and to have a very predictable performance. For instance, the cell array will not be activated unless the slowest of the decoding paths is finished, otherwise a risk of functionality loss exists. Configurable memories on the other hand, do not aim for performance predictability, they use completion detection interfaces between the different memory circuits. As a result, functionality is guaranteed and predictability is degraded, but performance is higher on average due to the lack of fixed worst-case timing margins. This means that the use of configurable memories will probably even increase the yield of the organization if used with a proper design methodology.

The method according to embodiments of the present invention is now described in more detail.

Figure 1:
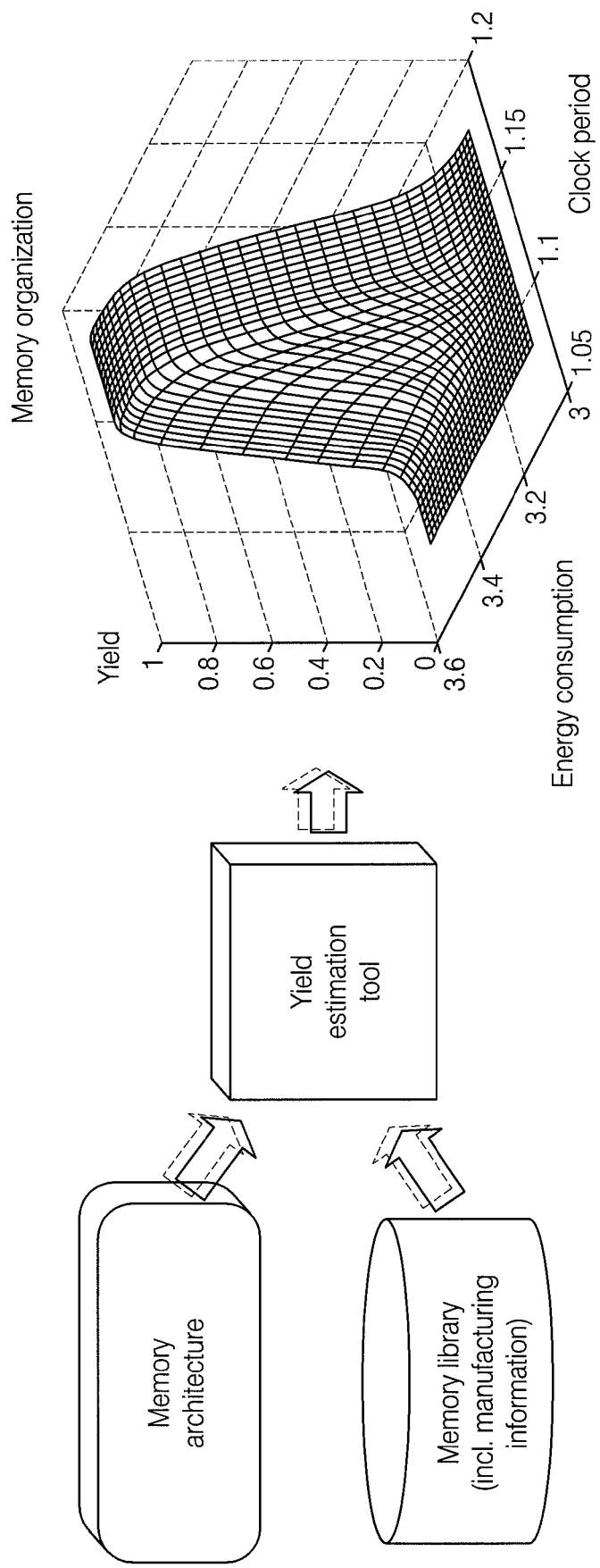
FIG. 1. Timing yield and average/worst-case energy consumption of an electronic system, e.g. a memory organization, can be accurately estimated given its architecture and information about the statistical distributions of energy and delay at the level of individual components, e.g. memories.

In order to estimate the yield and, a corresponding value for a performance variable, e.g. the average energy consumption, of the fabricated electronic system, e.g. memory organization, two inputs are required, see FIG. 1. The first is a description of the composition of the electronic system in terms of which individual components are used, e.g. the output of system synthesis or architectural exploration, which defines the composition of the electronic system, e.g. memory organization, in terms of which individual components, e.g. memory types, are going to be used and the data to component, e.g. memory, assignment decision. The second input is statistical properties of the individual components of the electronic system, e.g. a component library, e.g. memory library, which includes information about the statistical distributions of the energy and delay of the individual components, e.g. memories, implemented in the target process of the product.

Hereinafter, embodiments of the present invention are explained while referring to (dynamic) energy consumption and delay (also called timing) as first and second performance variables. However, the present invention is not limited thereto, and other performance variables can be considered as well, such as e.g. leakage power weighted with activity level (power on/off and dynamic energy consumption, or leakage energy consumption with dynamic energy consumption.

Figure 4:
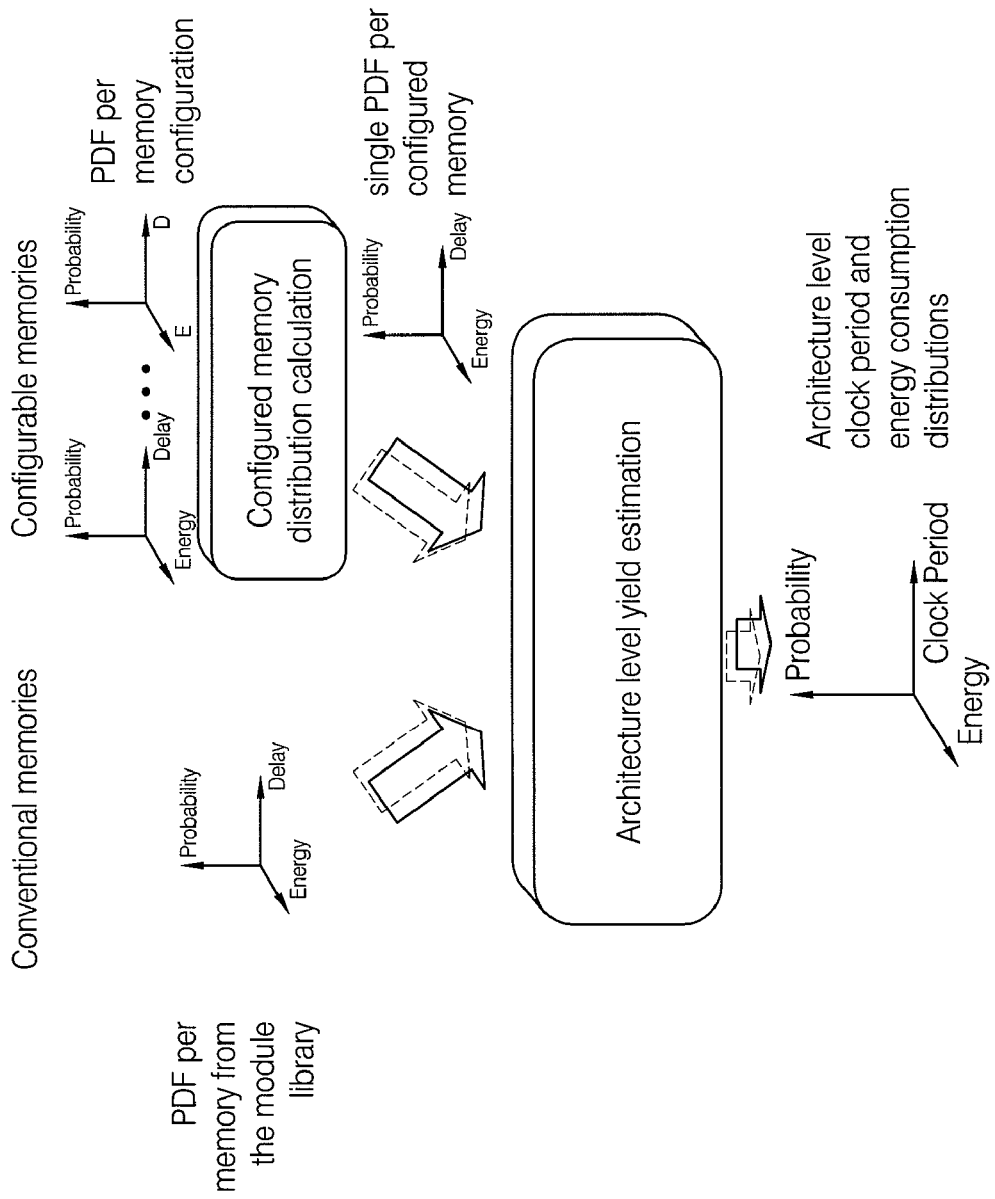
FIG. 4. The two steps of a technique according to embodiments of the present invention: first the post-configuration memory level distributions (PDF of the individual components) and then the architecture yield (timing metric) and energy consumption are estimated.

Given the above inputs, the estimation of yield and corresponding value for a performance variable, e.g. energy, comprises two steps, see FIG. 4. The first step aims at obtaining the system level, e.g. memory level, energy and delay distributions. In case of conventional individual components, e.g. memories, this is straightforward, because they are supplied by the component library, e.g. memory library. In case of configurable components, e.g. configurable memories (or any configurable IP block in general) though, special treatment is needed. The distribution of a configurable component, e.g. configurable memory, after it has been configured depends on the clock period target. Furthermore, it may not be a simple Gaussian distribution and as a result it requires a methodology that can handle any kind of distribution.

At the level of individual components, e.g. memories, the energy/delay statistical distributions can be obtained via transistor-level simulations or measurements. We performed the characterization using transistor-level simulations. The simulations indicate that in the case of conventional memories energy and delay follow a Gaussian bivariate distribution with non-negligible correlations between them.

Performing similar simulations using configurable memories also indicates that each setting of the configurable memory follows a bivariate Gaussian distribution in energy and delay. The left hand side of FIG. 5 shows the energy/delay bivariate probability density functions for a configurable 1 KByte memory. The distributions of the two settings are easily identified and do not overlap significantly, barring extreme values.

The step of configuring such a component, e.g. memory, to meet a given clock period constraint needs to be handled in a statistical manner as well. The individual component, e.g. memory, is configured to its high-speed setting when its actual delay of the low-energy setting after fabrication fails to meet the clock period. This can be modeled as a sum of two probabilities, the probability that the actual sample of the low-energy distribution meets the clock multiplied by the conditional low-energy distribution and the probability that the actual low-energy sample does not meet the clock times the high-speed distribution. Performing such a mathematical manipulation on the bivariate density functions results in the following formulation for the bivariate distribution of a configured memory (the symbols in the formulae are explained in Table 1):

$$f_{conf}(t, e) = \frac{1}{2}\text{erfc}\left(\frac{T_m - \mu_{ts}}{\sqrt{2}\,\sigma_{ts}}\right)f_1(e)f_2(t) + f_3(e)f_4(t)UnitStep(T_m - t)$$

where the $f_x$ functions are Gaussian univariate probability density functions with the following moments $$f_1(e) = N(\mu_{ef}, \sigma_{ef}),$$

$$f_2(t) = N\left(\mu_{tf} - \frac{\rho_{tef}\sigma_{tf}(e - \mu_{ef})}{\sigma_{ef}}, \sigma_{tf}\sqrt{1 - \rho_{tef}^2}\right),$$

$$f_2(e) = N(\mu_{es}, \sigma_{es}) \text{ and}$$

$$f_4(t) = N\left(\mu_{ts} - \frac{\rho_{tes}\sigma_{ts}(e - \mu_{es})}{\sigma_{es}}, \sigma_{ts}\sqrt{1 - \rho_{tes}^2}\right).$$

erfc is the complementary error function. The advantage of staying with a bivariate formulation after the memory configuration is that all the correlations between energy and delay are preserved. This bivariate distribution is illustrated in the right hand side of FIG. 5. The effect of the configuration can be clearly seen where the low-energy distribution suddenly drops off when the memory delay becomes equal to the clock period constraint.

TABLE 1

Table of symbols used in the statistical calculations

| | |
|---|---|
| $N(\mu, \sigma)$ | PDF of Gaussian distribution with mean μ and standard Deviation σ |
| $N(\mu_1, \sigma_1, \mu_2, \sigma_2)$ | PDF of bivariate Gaussian distribution |
| $\mu_{ts}$ | mean delay of slow memory distribution |
| $\mu_{tf}$ | mean delay of fast memory distribution |
| $\sigma_{ts}$ | standard deviation of delay of slow memory distribution |
| $\sigma_{tf}$ | standard deviation of delay of fast memory distribution |
| $\mu_{es}$ | mean energy of slow memory distribution |
| $\mu_{fs}$ | mean energy of fast memory distribution |
| $\sigma_{es}$ | standard deviation of energy of slow memory distribution |
| $\sigma_{ef}$ | standard deviation of energy of fast memory distribution |
| $\rho_{tes}$ | Energy/delay correlation in slow distribution |
| $\rho_{tef}$ | Energy/delay correlation in fast distribution |
| $T_m$ | target clock period |

In order to evaluate the timing and the energy consumption of the electronic system, e.g. the entire memory organization, two different kinds of transformations are needed. When propagating the first and second performance variable statistics, e.g. delay-energy statistics, from the component or module level to the system or architecture level, different propagation laws apply. For example in the delay dimension, the slowest component will determine the speed of the system. Timing is thus obtained via a maximum operation: a max formulation in terms of the component delay statistics, which translates into a specific integral in terms of the PDFs in the delay dimension. In the energy dimension, however, the total energy is the stochastic sum of the component energies. Each component is accessed a given number of times. Because the very same instantiation of a sample from the component modulation is accessed repeatedly, the number of times each component is accessed simply translates in a proportional scaling of the module energy distribution axis. Energy consumption involves a weighted sum operation. As arbitrary instantiations of each component are combined into an electronic system, the total energy statistic is described by stochastic addition. Thus, after rescaling with the access frequencies, the energy dimension can be collapsed using convolutions, defined by a convolution integral in terms of the PDFs in the energy dimension.

The combination of the convolution in the second performance variable dimension, e.g. energy dimension, and the max formulation in first performance variable dimension, e.g. the delay dimension, of two bivariate PDFs is described by the following integral:

$$f_c[t_d, P_w] = \int_{-\infty}^{t_d} \int_{-\infty}^{\infty} (f_1[t_d, P_w - v_p]f_2[u_t, v_p] + f_1[u_t, P_w - v_p]f_2[t_d, v_p])dv_p du_t$$

wherein $f_c[t_d, P_w]$ stands for the combined first performance variable—second performance variable PDF, e.g. delay-energy PDF.

The formulation can be verified for the specific case of two bivariate Normal distributions without first performance variable—second performance variable, e.g. delay-energy, correlation. It then results in the following PDF description:

$$e^{-\frac{(-P_w+\mu P1+\mu P2)^2}{2(\sigma P1^2+\sigma P2^2)}} \frac{\left( \frac{e^{-\frac{(t_d-\mu t2)^2}{2\sigma t2^2}}\left(1+\mathrm{Erf}\left[\frac{t_d-\mu t_1}{\sqrt{2}\,\sigma t1}\right]\right)}{\sigma t2} + \frac{e^{-\frac{(t_d-\mu t1)^2}{2\sigma t1^2}}\left(1+\mathrm{Erf}\left[\frac{t_d-\mu t2}{\sqrt{2}\,\sigma t2}\right]\right)}{\sigma t1} \right)}{4\pi\sqrt{\sigma P1^2+\sigma P2^2}}$$

$$\frac{e^{-\frac{(t_d-\mu t2)^2}{2\sigma t2^2}}\left(1+\mathrm{Erf}\left[\frac{t_d-\mu t_1}{\sqrt{2}\,\sigma t1}\right]\right)}{\sigma t2} + \frac{e^{-\frac{(t_d-\mu t1)^2}{2\sigma t1^2}}\left(1+\mathrm{Erf}\left[\frac{t_d-\mu t2}{\sqrt{2}\,\sigma t2}\right]\right)}{\sigma t1}$$

The terms reflect the max formalism in terms of the two Normal CDF and PDF combinations in the first performance variable, e.g. delay, dimension.

The factors $$e^{-\frac{(-P_w+\mu P1+\mu P2)^2}{2(\sigma P1^2+\sigma P2^2)}} \text{ and } \sqrt{\sigma P1^2+\sigma P2^2}$$

describe a Normal univariate PDF with the parameters resulting from the convolution of two Normal distributions in the second performance variable, e.g. energy, dimension.

The integral represents an operator onto the two bivariate PDFs. It is commutative and associative, so that it can be concatenated (Folded) onto a sequence of component PDFs, resulting in the bivariate architecture level PDF. The component PDFs can have arbitrary shapes and even be multimodal. The operator even properly propagates within component correlations between first and second performance variables, e.g. delay and energy.

A first impediment for straightforward implementation is the fact that the component level PDF descriptions are mostly in the form of a discrete Monte Carlo samples, i.e. "clouds" of results, while the propagation operator is defined in terms of continuous bivariate PDF descriptions. One approach is to convert the sample into a bivariate histogram and to use the resulting frequencies along with the histogram bin centers as the basis for interpolation of the PDF. Normalization of the frequencies into PDF estimates can then be done with a prefactor obtained through numerical integration of the interpolation function over the PDF domain covered by the simulations. This approach is rather cumbersome however, as it is complicated by the seemingly arbitrary selection of the binning parameters. A proper balance between bin width, number of bins and average bin content has to be found for a representative bivariate histogram description. Finding valid binning parameters for arbitrary PDF's turns out to be rather challenging: especially multimodal PDF's tend to lead to sparse histogram frequency matrices that invalidate higher order interpolation algorithms.

Performing different transformations on the two axes of a bivariate distribution like the one in FIG. 5 does not have a closed form solution unfortunately in the general case. As a result, we have to work with marginal probability density functions, which are the projections of the bivariate distributions on the two axes.

The correlations that exist between energy and delay at the component level, e.g. individual memory level, are fully taken into account at the level of the electronic system, e.g. the memory organization. When doing transformations on statistical distributions, the correlations do not change as long as the transformations are monotonically increasing [C. Genest, A. C. Favre, "Everything you always wanted to know about copula modeling but were afraid to ask", Journal of Hydrologic Engineering, 11, 2006]. In the present case, both the weighted sum and the maximum operation are increasing, because the energy consumption cannot be negative. So the correlations are not affected by the transformations. Since they are already taken into account in the individual component formulations, e.g. memory level formulations, they are present in the final electronic system, e.g. memory organization, yield and energy consumption formulations.

As discussed hereinabove, yield loss is incurred when at least one of the individual components, e.g. memories, in the electronic system, e.g. memory organization, fails to meet a constraint, for example the clock period. The reason is that, for example for a memory organization, if a memory cannot react in time, the wrong data is latched and the IO behavior of the system (memory organization) is not respected. It is evident that in order to have a functional electronic system, e.g. memory organization, the slowest individual component, e.g. memory, needs to be faster than the clock.

In the following, a memory organization is considered as the electronic system, the individual components being memories. This, however, is not intended to limit the invention in any way, and what follows can easily be generalized from "memories" and "memory organization" into "individual components" and "electronic system".

Let's define M as the set of memories in the memory organization. The delay of each of them is a random variable $D_{mi}$. The delay of the memory organization is also a random variable $D_{mo}$, which is defined as the max of all the memory delays $D_{mi}$.

An analytical formulation of the maximum of a number of probability density functions of any type is given by the following formula, for an example of three distributions:

$$f_{max}(t) = \int_t \int_t (f_1(t)f_2(t_2)f_3(t_3) + f_1(t_2)f_2(t)f_3(t_3) + f_1(t_2)f_2(t_3)f_3(t))dt_2dt_3$$

For each term in the sum inside the integral, a sample from a different PDF is assumed to be maximum. The first term, for instance implies that the sample from PDF $f_1$ is the maximum. The multiplication with the other two PDFs and the cyclic permutation of the PDF including the maximum makes sure all the possibilities are covered. The integration limits make sure that the "secondary" variables $t_2$ and $t_3$ never exceed t. When performing the integration, the following compact formulation is obtained for discrete distributions:

$$f(D_{mo}) = \sum_{j=1}^{n} \left( f(D_{mj}) \prod_{k \neq j}^{n} F(D_{mk}) \right)$$

The reasoning used to obtain the above maximum formulation does not depend on the underlying distributions used. It is also generic in the sense that it can handle any number of distributions. As long as the probability density functions of the different random variables are available either in analytical form or as experimental results, this formulation can be used to extract the maximum. In the second case however, the results need to be calculated numerically.

From the probability density function of the memory organization delay we can easily extract the system-level parametric yield, or the percentage of memory organizations that meet the clock period target constraints after fabrication.

The second important cost metric for embedded systems is energy consumption. System designers need to be able to estimate the energy that their chip will consume in order to know if they meet the battery supply or the lifetime between recharging specifications. The energy consumption of the complete electronic system, e.g. memory organization, is a sum of the energy consumptions of each of the components, e.g. the sum of the energy consumption per access of each individual memory multiplied by the number of accesses to each memory.

In the following, a memory organization is considered as the electronic system, the individual components being memories. This, however, is not intended to limit the invention in any way, and what follows can easily be generalized from "memories" and "memory organization" into "individual components" and "electronic system".

If it is assumed that $E_{mo}$ is the random variable representing the energy consumption of the memory organization, $E_{mi}$ is the random variable of the energy consumption per access of memory i and $acc_i$ is the deterministic number of accesses to memory i, then:

$$E_{mo} = \sum_{i=0}^{N} acc_i E_{mi}$$

where N is the number of memories in the organization. Such a weighted sum is a straightforward operation on statistical distribution only if they are Gaussian distributions. However, a more generic solution is needed that can handle any kind of distribution. Statistical addition is like convolution in the time domain, because each sample of one distribution needs to be added to all the samples of the other distributions. Convolution in the time-domain, however, is equivalent to multiplication in the frequency-domain. The Fourier transform and its inverse can be used to move from the time to the frequency domain and vice versa. This solves the problem of adding random variables that have arbitrary distributions. The only disadvantage of this approach is that analytical closed-form formulae for the distributions we are treating are not available, thus the computations need to be done numerically. The multiplication with the access frequencies is straightforward and will be performed in the time domain before the Fourier transform. Summarizing the above, the probability density function of the energy consumption of the memory organization can be obtained by the following calculations:

$$f(E_{mo}) = \text{Fourier}^{-1}\left( \prod \text{Fourier}(acc_i f(E_{mi})) \right)$$

where the function Fourier represents the Fourier transform and Fourier$^{-1}$ is the inverse Fourier transform.

On top of the system timing and delay statistics, also application timing and delay statistics can be determined, for applications running on the system.

The task timing statistics can be expressed in terms of the statistics of the complete electronic system (at least for a microprocessor type of architecture) as follows:

$T\text{applic}=\text{Sum\_task}(T\text{Task})<DL$ where
$T\text{Task}=\text{\#cycles}*T\text{arch}$ where Tarch is the statistical timing variable for the whole architecture.

The time needed for running an application equals the sum of the times needed for running each of the tasks, where the time needed for running a task equals the number of cycles the architecture or electronic system is cycled through, multiplied by the time needed to cycle through the electronic system.

On the other hand, when parallelism is exploited, the time needed to execute a task comprising a plurality of parallel sub-tasks can be expressed as follows:

$T\text{Task}=\text{max\_sub-tasks}(T\text{sub-task})$ where $T\text{sub-task}=\text{\#cycles}*T\text{arch}$ where Tarch is the statistical timing variable for the whole architecture.

Likewise for energy:

$E\text{Applic}=\text{Sum\_task}(E\text{Task\_}i)$ where $E\text{Task\_}i=ET\text{Arch}$ for a test bench t_bench_i exercising that task_i.

The energy needed to run an application equals the sum of the energies needed for running each of the tasks, where the energy needed for running a task is determined by the energy needed by the electronic system (architecture) when exercising the tasks.

In order to model the impact of process variability on the delay and energy consumption of individual components, e.g. memories, a number of transistor-level simulations have been performed for memories of different size using SPICE according to the characterization methodology proposed in [H. Wang, M. Miranda, W. Dehaene, F. Catthoor, K. Maex, "Impact of deep submicron (DSM) process variation effects in SRAM design", Proc. 4th ACM/IEEE Design and Test in Europe Conf. (DATE), Munich, Germany, pp. 914-919, March 2005.] at the 65 nm technology node.

To evaluate the accuracy of the methodology in accordance with embodiments of the present invention a system-level simulator has been developed that can evaluate the performance of the electronic system, e.g. memory organization, based on the statistical properties of the energy consumption and performance of the individual components, e.g. individual memories, as described hereinabove. A Monte Carlo loop has been implemented at the level of the electronic system, e.g. memory organization, to obtain the bivariate energy consumption and performance statistical distribution. In each case, 2000 memory organization level simulation runs are performed. The resulting distribution is compared to the results of the yield estimation methodology in accordance with embodiments of the present invention. Results of the evaluation are given hereinafter.

The application drivers used are multimedia (image processing and audio decoding) and wireless applications, which are representative of the domain that is targeted. The Orthogonal Frequency-Division Multiplexing (OFDM) front-end and error correction application performs the digital baseband signal processing for a digital wireless receiver. The low-power mapping of this application results in a distributed heterogeneous local memory layer comprising 8 memories with sizes ranging from 1 to 8 KByte. The Cavity Detection (CavD) is an image processing application that detects cavities in images, by repeatedly filtering the input image. Its memory organization is distributed but homogeneous, comprising five nominally identical 8 KByte memories. A third application used is an MP3 decoder. Mapping it on a low-power memory organization results in a distributed organization, which has only two different memory types. Thus it is a hybrid between the very heterogeneous memory organization of the OFDM and the homogeneous organization of the Cavity Detection. The above three application drivers will enable evaluation of the impact on the system level parametric yield of different kinds of low-power memory organization architectures.

The comparison between the results obtained from the simulations and the ones calculated using the methodology in accordance with embodiments of the present invention are presented in Table 2. The first column reports the estimated timing yield of the memory organization for the clock period that meets the real-time constraint of the respective application. The second and third columns report the estimated average energy of the memory organization that meet the timing constraint and the estimated worst-case energy consumption or the 99.9% energy yield. The next three columns report the same results coming from the simulation of the memory organization. The rows represent the tree different design options shown in FIG. 2 for each of the three application drivers.

TABLE 2

|  | estimation | | | simulation | | | % error | | |
| --- | --- | --- | --- | --- | --- | --- | --- | --- | --- |
|  | timing yield(%) | average energy | worst-case energy | timing yield(%) | average energy | worst-case energy | timing yield(%) | average energy | worst-case energy |
| CavD original | 51.27 | 1 | 1.028 | 51.1 | 1.0009 | 1.027 | 0.33 | 9e-4 | 1e-3 |
| CavD redesign | 99.99 | 1.34 | 1.396 | 99.99 | 1.34 | 1.391 | 1e-5 | 8e-6 | 0.33 |
| CavD conf | 99.99 | 1.043 | 1.286 | 99.99 | 1.042 | 1.309 | 1e-5 | 0.03 | 1.78 |
| OFDM original | 92.52 | 1 | 1.108 | 90.85 | 0.9999 | 1.114 | 1.8 | 4e-5 | 0.5 |
| OFDM redesign | 99.99 | 1.35 | 1.496 | 99.99 | 1.352 | 1.505 | 1e-5 | 2e-5 | 0.6 |
| OFDM conf | 99.99 | 1.003 | 1.202 | 99.99 | 1.004 | 1.205 | 1e-5 | 7e-4 | 0.3 |
| MP3 original | 95.71 | 1 | 1.119 | 94.8 | 1.001 | 1.142 | 0.95 | 0.1 | 2 |
| MP3 redesign | 99.21 | 1.339 | 1.53 | 99 | 1.337 | 1.54 | 0.21 | 0.16 | 0.64 |
| MP3 conf | 99.23 | 1.006 | 1.292 | 99 | 1.008 | 1.294 | 0.2 | 0.22 | 0.19 |

The accuracy of the yield estimation methodology according to embodiments of the present invention is very good compared to the simulations; the estimation error has an average value of less than 0.5%. Furthermore, this error seems to be independent of the type of memory organizations. No matter if it is heterogeneous or homogeneous, if it is very distributed or not, the estimation error is very small. Furthermore, comparing the results for the three different design choices for the OFDM application in Table 2, it can be seen that the yield is significantly improved by using high-speed (5th row) or configurable memories (6th row) compared to the initial low power implementation (4th row). The difference between the energy consumption is also very large; the use of configurable memories enables the system to minimize the energy overhead invested for the yield optimization. For the Cavity Detection application things are very different. The memory organization is homogeneous, so any of the 5 memories is a potential source of yield loss. Thus all the memories have to be substituted by high-speed or configurable memories. This incurs a significant penalty in energy consumption in the case of high-speed memories, but the increase in yield is very large. The difference between the energy penalty of the configurable compared to the high-speed memories is evident in this application too. The use of high-speed memories increases the energy consumption by about 34% for processing one frame. The use of configurable memories can significantly reduce the total energy consumption, reducing the penalty to just 4.3% for the same yield. But a slight area overhead will exist. Similar conclusions apply for the MP3 application. It becomes clear that the yield/energy trade-offs that constitute the optimal memory organization depend not only on the available memory implementations, but also heavily on the set of applications that will be running on that architecture. For instance, memories that are used seldom will benefit from a high-speed implementation due to the lack of area overhead. These kinds of trade-offs justify the usefulness of such a technique/tool for system designers. It is very difficult for a designer to make the proper decision, especially in the case on complex system architectures, without CAD support. Designers nowadays do not have a way to quantify these "yield vs. energy consumption" trade-offs and are forced to take worst-case margins to maximize yield. A CAD tool that could quantify these trade-offs would aid the system designer in removing unnecessary margins and in designing a more efficient system.

Embodiments of the present invention present a methodology to accurately estimate and quantify the "yield vs. energy consumption" trade-offs that can be obtained by using different implementations of memories coming from different libraries during the design of the memory organization. This can aid the system designer into reducing unnecessary design margins that are currently used. The accuracy of the estimation methodology is very large; an average error of less than 1% is reported for each type of memory organization or performance metric.

One objective of embodiments of the present invention is to provide an analytical framework for the estimation during the design trajectory of how many of the systems, which comprise a number of applications running on a platform, are going to meet a given timing constraint and a given energy budget. This can be expressed as:

$$P(e \leq E | t \leq T),$$

which represents the probability that a system will have an energy consumption lower or equal to an energy budget E on condition that their execution time is less or equal to a timing constraint T. To be able to link the system level timing and energy consumption and to obtain the above metric the bivariate cumulative density function $F_{TE}(t,e)$ needs to calculated, which represents the probability that the system will have an execution time of less than T and an energy consumption of less than E.

Given that the system component combined energy/delay distributions are known, the methodology used to calculate the above objective is summarized in FIG. 7. The energy consumption per activation and operation delay of each component is described by a single two-dimensional normal distribution. This distribution is split to separate uni-dimensional distributions for the energy and delay and these are propagated up to higher abstraction levels, like task and application level. At the application level the uni-dimensional distributions are combined to a bivariate distribution, from which the combined timing and energy parametric yield can be calculated. Obviously, at the component level these two distributions are correlated. But, as explained later and validated by simulations, these correlations are largely lost at the application level due to the characteristics of typical embedded system realizations.

Hereinbelow, the following conventions are used. $f(y_x)$ denotes the probability density function (PDF) of random variable y at level x, which can be component, task or application and $N(\mu,\sigma)$ represents a normal distribution with a mean and standard deviation.

The next paragraphs explain in more detail how to calculate the uni-dimensional PDFs at the various levels and how to combine them at the application level. Furthermore, the application of the methodology will be illustrated on a distributed memory organization as a case study.

A. System Component Level Probability Distributions

A requirement of this methodology is that the system components are statistically characterized and that their stochastic properties are known at design-time. As an example, we outline such a characterization for on-chip memories of the first data layer.

Using a brute-force approach a Monte Carlo loop has been performed on top of HSPICE transistor-level simulations on the lumped netlists of small memories for the 65 nm technology node. The impact of process variability on the threshold voltage and the beta of the transistors was modeled. Variability on the electrical parameters of the back-end was neglected. The memory sizes used were representative of the sizes required by the local memory layers of the applications of the embedded systems domain, namely between 1 KByte and 16 KByte. The probability density functions for energy and delay for each memory were calculated from the simulation results. The analysis of the experiments, see FIG. 8, shows that for each different memory design the energy and delay can be approximated by a normal distribution. The mean and the standard deviation can be fit from the simulation data. The correlations between the delay and the energy distributions can also be calculated from the simulation data. The error from approximating these histograms using normal distributions is very small, as will be explained below.

The component characteristics can be determined by the following functions:

$$f(e_c) = N(\mu_{ec}, \sigma_{ec})$$

is the energy probability density function and:

$$f(d_c) = N(\mu_{dc}, \sigma_{dc})$$

is the PDF of the operation delay.

B. Application Task Level Probability Distributions

Each task involves activations of a given set of components, i.e. processor cores or memories. The energy consumption of a task $E_t$ is defined by the sum of the energy per activation of each component used by the task weighted by the number of activations:

$$E_t = \sum_i \# \, act_i * E_{c-i}$$

where $E_{c-i}$ is the energy per activation of component i. Clearly, the task energy is an affine transformation of the energy consumption of the various components. Given that the energy consumption of each component is described by a normal distribution, the energy consumption of the task will also be described by a normal distribution, as described by A. Papanikolaou et al. in "A System-Level Methodology for Fully Compensating Process Variability Impact of Memory Organizations in Periodic Applications", Intl. Conf. on HW/SW Co-design and System Synthesis (CODES+ISSS), September 2005. Its mean and standard deviation will depend on the component level distribution characteristics.

The delay of the task is the critical component delay, which is the minimum clock period that will not result in timing violations for any of the components used by the given task. This delay is the maximum activation delay of the components accessed during the execution of the task. The maximum of a number of normal distributions can also be approximated by a normal distribution, as described by D. Montgomery et al. in "Applied statistics and probability for engineers", John Wiley & Sons, 1994. So, the task delay can also be described by a normal distribution with given mean and sigma:

$$f(d_t) = N(\mu_{dt}, \sigma_{dt})$$

Compared to the conventional yield metric the main difference is that only the components involved in the mapping of the given task decided at compile-time are taken into account. This relaxes the timing or energy constraints on the rest of the system components. Since they are not used for the current task, they are allowed to violate the timing and/or energy specs while the given task is executed, which enables the use of a potentially faster clock frequency.

C. Full Application Level Probability Distributions

Applications consist of a number of tasks. Many applications of the embedded systems domain are static and frame-based, which means that their tasks are periodically created and stopped. Examples include video and audio decoding applications. Other applications can launch tasks based on events, such as the input stream or user interaction. At design-time some statistical information is needed about the usage profiles of the device, in order to estimate yield as accurately as possible. In the domain of portable embedded systems such a characterization is feasible, because the set of applications is known.

The application energy consumption is just a sum of the tasks' energy consumption and the application execution time a sum of task delays weighted by their respective number of cycles. Since affine transformations of normal distribution remain normal, as described by A. Papanikolaou et al. in "A System-Level Methodology for Fully Compensating Process Variability Impact of Memory Organizations in Periodic Applications", Intl. Conf. on HW/SW Co-design and System Synthesis (CODES+ISSS), September 2005, the energy and execution time of each application configuration can be described by a normal distribution.

D. System Level Combined Time/Energy Yield Estimation

Having the uni-dimensional probability density functions of energy and execution time at the application level, the bivariate distribution can be obtained that can link energy consumption and execution time. This requires knowledge about the correlation between the energy consumption and the execution time of the application. However, the task execution time is defined by the maximum of the components' delays. Obviously a single critical path component defines this delay. Energy consumption, on the other hand, is a weighted sum of the energy of all the individual components of the system. This means that the correlation between system level energy and execution time is negligible. This assumption is valid for both heterogeneous and homogeneous systems, due to the nature of process variability. Its unpredictable impact on the performance of the system components means that even a nominally homogeneous system will a single components that is the critical for delay.

Hence, the execution time and energy consumption probability density functions (PDF) can be combined into a bivariate density function as if they were independent, and the bivariate PDF is of the form $f_{TE}(t,e)$. FIG. 9 illustrates the bivariate cumulative distribution for a wireless receiver application. The conditional probability density of e for a given T can be expressed as:

$$f_{E|T \leq DL}(e) = \int_{-\infty}^{DL} f_{ET}(t,e)\,dt.$$

In FIG. 9, this can be visualized as the projection of the points that have an execution time equal to the given deadline on the parametric yield vs. energy consumption plane.

A further step is to estimate the number of samples that operate within given timing constraints and within a given energy budget under a given application configuration. That is defined as the integration of the previous equation with respect to e on the interval from minus infinity to EB, where EB is the energy budget:

$$F_{E|T \leq DL}(e \leq EB) = \int_{-\infty}^{EB}\int_{-\infty}^{DL} f_{TE}(t,e)\,dt\,de.$$

This number corresponds to the point that has an energy consumption equal to the specified energy budget and an execution time equal to the timing constraint in the two-dimensional CDF of FIG. 9. It is clear that such bivariate distributions at the application level are very powerful tools for the system designer in order to predict the behavior of his system after fabrication.

To evaluate the yield estimation methodology in accordance with embodiments of the present invention, it has been applied on the memory organizations of four embedded, memory dominated and low-power systems that have to meet hard real-time application deadlines. The impact is illustrated of using yield-aware DFS on the yield of these systems. For these applications the data memory organization is a representative and very important subsystem of the entire chip.

E. System Simulator

A simulator has been developed in order to evaluate the accuracy of the estimated application level yield. This simulator enables the implementation of a Monte Carlo loop on top of a system-level simulation, which simulates the data storage related application behavior and measures its memory organization related energy consumption and execution time, based on pre-characterized statistical memory characteristics and application profiling. The statistical data about the performance and energy consumption of the individual memories were outlined in section V-A. Using the same component-level statistical data as a baseline, the application yield has been analytically calculated and a few thousand simulations of the system operation have also been performed to calculate the yield experimentally. These results are compared to validate the accuracy of the approach in accordance with embodiments of the present invention. The computations discussed hereinabove have been done numerically.

F. Application Drivers

The four application drivers used are multimedia (image processing, audio decoding and video encoding) and wireless applications, which are representative of the domain targeted. The relevant characteristics of these applications are summarized in Table 3. Table 3 shows a Summary of the relevant characteristics of the applications. The number of memories used by each application and its tasks is shown in the third column. The fourth column is the execution time for the processing of one frame and how this time is broken down among the various application tasks.

TABLE 3

| Application | Task | Memories used | Execution |
|---|---|---|---|
| DAB | | 8 | |
| | FFT | 3 | 33.3% |
| | Unscrambling | 3 | 13.7% |
| | Viterbi | 7 | 53% |
| CavD | | 5 | |
| | Blurring | 3 | 27% |
| | Horiz. Filtering | 2 | 36.2% |
| | Vert. filtering | 2 | 36.8% |
| MP3 | | 7 | |
| | Requantizer | 3 | 0.6% |
| | Stereo | 2 | 0.5% |
| | Antialias | 4 | 1.5% |
| | Hybrid Synth | 5 | 17.8% |
| | Freq inversion | 1 | 0.2% |
| | Filterbank | 7 | 79.4% |

TABLE 3-continued

| Application | Task | Memories used | Execution |
|---|---|---|---|
| QSDPCM | | 23 | |
| | ME sub4 | 11 | 2.7% |
| | ME sub 2 | 13 | 37.5% |
| | Quad-tree constr. | 19 | 59.8% |

The Digital Audio Broadcast (DAB) receiver performs the digital baseband signal processing for a digital radio device. The low-power mapping of this application results in a distributed heterogeneous local memory layer comprising 8 memories. Three tasks are executed per decoding of one frame and the tasks are relatively balanced in workload. The Cavity Detection (CavD) is an image processing application that detects cavities in images, by repeatedly filtering the input image. The resulting memory organization is distributed but homogeneous, consisting of five nominally identical memories. Like the DAB, it also executes three tasks per frame, no task dominates the execution time of the processing of one frame. The third application we have used is the MP3 decoder. Its memory organization is also heterogeneous and distributed, thus it is similar to the DAB in that respect. But it consists of 6 tasks, one of which dominates the execution time and energy consumption of the application and uses all the memories available. Thus, applying DFS at run-time to improve yield will not make a significant difference, since the dominant task has to operate at the slowest possible clock frequency. The last application driver is the QSDPCM, which is a hierarchical video encoder that operates on CIF images. It has a very distributed and heterogeneous memory organization comprising 23 memories. It is divided into three tasks, one of which has a negligible execution time compared to the other two which share the total execution time almost evenly.

All four applications are memory dominated, frame based and their behavior is rather static, relatively little application dynamism exists during their execution in the form of data dependent conditions. But the methodology is not limited to such applications. Given statistical information about the dynamic behavior of the application, the application yield of any system could be calculated.

Hereinbelow, results are illustrated showing the improvement in timing parametric yield that can be achieved by using a yield-aware Dynamic Frequency Scaling strategy in accordance with embodiments of the present invention. All the results in the first section are simulation results. In a second part, the accuracy of the application yield metric estimation technique will be addressed, where the analytical yield estimation results will be compared to simulation results.

Table 4 outlines the resulting parametric yield for the QSDPCM application when using a conventional design approach or yield-aware DFS and the two metrics discussed above, the conventional and the application yield. The conventional yield metric cannot capture the impact of yield-aware DFS, thus the designers have no way of evaluating the yield gain they can achieve by using yield enhancement techniques. Using the application yield metric, they can employ such techniques to improve the yield of the systems and to reduce the excessive worst-case design margins at the circuit or device level.

TABLE 4

| | no DFS | yield-aware DFS |
|---|---|---|
| conventional yield | 94.79% | 94.79% |
| application yield | 94.79% | 99.99% |

Table 5 shows the gains that can be achieved in the mean and the standard deviation of the PDFs illustrated in FIG. 6 normalized to the respective application timing constraint for the four application drivers. The means become slightly smaller making the execution time smaller, but the reduction of the standard deviation is significant, which means that the +/−3 or 6 sigma points (the typical worst-case corners depending on the design assumptions) are closer to the mean value compared to those of the constant clock design. The result is that the execution time of the system using the yield-aware DFS technique becomes smaller and more predictable. For a given design this can be translated into additional parametric yield as can be seen in the last two columns of Table 5. The yield results are rounded at the second decimal digit. Alternatively, this additional timing parametric yield can be traded-off at design time for smaller design margins that would reduce the energy consumption of the system, if the application deadline is sufficiently relaxed. The required overhead in order to achieve these gains is the measurement of the performance of the individual components, which can be performed either on-die at run-time or at testing-time and a change in the clock frequency calculation strategy in the DFS controller.

TABLE 5

Timing performance of the constant clock system and the system using yield-aware DFS for the four applications normalized to the application timing constraint. Timing is improved in all cases and its predictability is significantly increased. The parametric yield using both approaches is shown in the two last columns measured using the application yield metric.

| | Constant clock design | | Design using yield-aware DFS | | Gain in time (%) | | Parametric yield | |
|---|---|---|---|---|---|---|---|---|
| | Execution time | | Execution time | | | | Constant | yield-aware |
| App | mean | std dev | mean | std dev | mean | std dev | clock | DFS |
| MP3 | 0.814 | 0.074 | 0.805 | 0.07 | 1.1 | 5.4 | 99.4 | 99.73 |
| DAB | 0.961 | 0.024 | 0.905 | 0.015 | 6 | 38 | 99.99 | 100 |
| CavD | 0.928 | 0.019 | 0.914 | 0.012 | 1.5 | 37 | 94.79 | 100 |
| QSDPC | 0.865 | 0.064 | 0.813 | 0.041 | 6 | 36 | 98.25 | 100 |

FIG. 10 shows the cumulative distribution functions that correspond to the PDFs in FIG. 6. The difference between the timing parametric yield calculated using the conventional system metric for a system with a constant clock frequency and the metric in accordance with embodiments of the present invention for a system using yield-aware DFS is illustrated. The distance between the two lines is the gain in parametric yield for the various target execution times that can be achieved using the DFS technique proposed. It also reports the maximum yield gains that can be achieved for the four applications. It is clear from the results that for the MP3 application legacy code, yield-aware DFS cannot make a significant difference for the reasons explained hereinabove. In this case, application yield degenerates into the conventional yield metric. A reimplementation of this application with more balanced bandwidth among tasks would not only alleviate the peak memory bandwidth requirement, but would also improve the system from a manufacturing viewpoint. For the three other applications, a significant difference exists between the two yield metrics. Thus using the conventional metric would result in a further over-design in the system, which in reality is not necessary.

Having established the gains that can be achieved by using DFS to improve the parametric yield, the analytical calculation of the new application timing parametric yield metric in accordance with embodiments of the present invention will be evaluated. Table 6 illustrates the accuracy of the yield estimation methodology according to embodiments of the present invention versus simulation results.

sumption reported in Table V, the slower the clock frequency the more the energy consumption can be reduced. The first row per application is the low-power configuration of the memory organization and the last row is the minimal execution time configuration. Both approaches, estimation and simulation, use exactly the same memory level statistical information. The assumption made that correlations are lost at the application level should, thus, introduce an error between the results of the two approaches, but this remains very small in practice. Another even smaller source of error is the assumption that the maximum of two normal distributions is a normal distribution. Despite these two assumptions, the results of the analytical calculation match the simulation results very well. The error in the mean values is negligible. The error in the estimation of the standard deviation is somewhat larger, about 8.5% on average, but still acceptable given the rise in abstraction level from memory to complete application. This gives further confidence in the two assumptions made for combining the application distributions.

FIG. 11 illustrates visually the statistical properties of the fast configuration of the DAB application. The analytically calculated statistical properties of the system are shown as the +/−1 sigma and the +/−3 sigma boundaries of the estimated distribution. The simulation results (points) fit very well in the drawn boundaries, most of the samples are inside the +/−1 sigma boundary and only very few extreme values exist beyond the +/−3 sigma boundary. Further validation of the assumption made about the loss of correlations can come from FIG. 11. The existence of correlations at the application

TABLE 6

Estimation error of the calculated statistical characteristics using the methodology according to embodiments of the present invention compared to simulation results for the four application drivers under various timing constraints per frame. All results are normalized to the maximum energy and execution time per application.

| Application | Norm. timing constraint | Simulation Results | | | | Estimation Results | | | | Error (%) | | | |
|---|---|---|---|---|---|---|---|---|---|---|---|---|---|
| | | Exec Time | | Energy | | Exec Time | | Energy | | Exec Time | | Energy | |
| | | mean | std dev | mean | std dev | mean | std dev | mean | std dev | mean | std dev | mean | std dev |
| MP3 | 1 | 0.781 | 0.076 | 0.729 | 0.016 | 0.771 | 0.062 | 0.731 | 0.016 | 1.3 | 18.4 | −0.2 | 3.9 |
| | 0.643 | 0.460 | 0.040 | 1 | 0.027 | 0.889 | 0.030 | 1 | 0.026 | 0.5 | 24.8 | −0.3 | 5.03 |
| DAB | 1 | 0.889 | 0.02 | 0.727 | 0.024 | 0.889 | 0.019 | 0.73 | 0.025 | −0.008 | 4.18 | −0.46 | −1.3 |
| | 0.83 | 0.745 | 0.016 | 0.773 | 0.024 | 0.746 | 0.016 | 0.778 | 0.025 | −0.071 | −3.6 | −0.57 | −3.13 |
| | 0.75 | 0.626 | 0.011 | 0.984 | 0.036 | 0.626 | 0.01 | 0.987 | 0.033 | −0.061 | 9.1 | −0.3 | 7.08 |
| | 0.67 | 0.584 | 0.01 | 1 | 0.036 | 0.584 | 0.01 | 1 | 0.033 | −0.065 | 1.32 | −0.32 | 6.84 |
| CavD | 1 | 0.894 | 0.017 | 0.752 | 0.016 | 0.895 | 0.016 | 0.753 | 0.014 | −0.13 | 7.8 | −0.17 | 8.9 |
| | 0.875 | 0.788 | 0.014 | 0.832 | 0.019 | 0.789 | 0.013 | 0.833 | 0.017 | −0.13 | 2.19 | −0.18 | 12.2 |
| | 0.75 | 0.705 | 0.013 | 0.920 | 0.019 | 0.706 | 0.012 | 0.922 | 0.018 | −0.1 | 7.6 | −0.2 | 6.8 |
| | 0.625 | 0.599 | 0.009 | 1 | 0.022 | 0.6 | 0.008 | 1 | 0.02 | −0.1 | 7.8 | −0.2 | 10.2 |
| QSDPCM | 1 | 0.859 | 0.040 | 0.766 | 0.007 | 0.842 | 0.034 | 0.767 | 0.0005 | 1.942 | 14.366 | −0.186 | 33.265 |
| | 0.875 | 0.765 | 0.033 | 0.863 | 0.008 | 0.750 | 0.032 | 0.864 | 0.007 | 2.005 | 2.819 | −0.164 | 5.809 |
| | 0.708 | 0.628 | 0.043 | 1 | 0.012 | 0.607 | 0.026 | 1.001 | 0.009 | 3.321 | 39.652 | −0.147 | 18.957 |

The confidence factor of the Monte Carlo simulation loop is 95.5% and the reported differences seem to be largely insensitive to further increase of this confidence factor (further experiments were performed in a few cases). The different normalized timing constraints used represent different memory configurations and Dynamic Frequency Scaling decisions. The technique presented by H. Wang et al. in "Impact of deep submicron (DSM) process variation effects in SRAM design", Design, Automation and Test in Europe, 2005 was used in order to distribute the execution time among the various application tasks. The memories used in those designs offer a configuration capability, thus when the clock frequency was relaxed some memories were also switched to a slower, but more energy efficient configuration. This configuration is responsible for the difference in energy conwould result in a rotation of the +/−3 sigma boundary of the estimated distribution. This would not have any significant impact, though, in the number of simulation points that would fall inside this boundary. Thus, the assumptions are not introducing significant inaccuracy. Furthermore, in FIG. 11 the histograms of the projections of the points on the two axes are shown. The fact that these histograms look a lot like normal distributions means that the assumption made in approximating all the distributions with normal distributions also does not introduce any significant error. Using a more elaborate PDF to approximate these histograms will not have a noticeable impact on the results.

The above-described method embodiments of the present invention may be implemented in a processing system 100 such as shown in FIG. 12. FIG. 12 shows one configuration of processing system 100 that includes at least one programmable processor 103 coupled to a memory subsystem 105 that includes at least one form of memory, e.g., RAM, ROM, and so forth. It is to be noted that the processor 103 or processors may be a general purpose, or a special purpose processor, and may be for inclusion in a device, e.g., a chip that has other components that perform other functions. Thus, one or more aspects of the present invention can be implemented in digital electronic circuitry, or in computer hardware, firmware, software, or in combinations of them. The processing system 100 may include a storage subsystem 107 that has at least one disk drive and/or CD-ROM drive and/or DVD drive. In some implementations, a display system, a keyboard, and a pointing device may be included as part of a user interface subsystem 109 to provide for a user to manually input information. Ports for inputting and outputting data also may be included. More elements such as network connections, interfaces to various devices, and so forth, may be included, but are not illustrated in FIG. 12. The various elements of the processing system 100 may be coupled in various ways, including via a bus subsystem 113 shown in FIG. 12 for simplicity as a single bus, but will be understood to those in the art to include a system of at least one bus. The memory of the memory subsystem 105 may at some time hold part or all (in either case shown as 101) of a set of instructions that when executed on the processing system 100 implement the steps of the method embodiments described herein. Thus, while a processing system 100 such as shown in FIG. 12 is prior art, a system that includes the instructions to implement aspects of the methods for determining system-level or application-level yield is not prior art, and therefore FIG. 12 is not labelled as prior art.

One embodiment also includes a computer program product which provides the functionality of any of the foregoing methods when executed on a computing device. Such computer program product can be tangibly embodied in a carrier medium carrying machine-readable code for execution by a programmable processor. This embodiment thus relates to a carrier medium carrying a computer program product that, when executed on computing means, provides instructions for executing any of the methods as described above. The term "carrier medium" refers to any medium that participates in providing instructions to a processor for execution. Such a medium may take many forms, including but not limited to, non-volatile media, and transmission media. Non volatile media includes, for example, optical or magnetic disks, such as a storage device which is part of mass storage. Common forms of computer readable media include, a CD-ROM, a DVD, a flexible disk or floppy disk, a tape, a memory chip or cartridge or any other medium from which a computer can read. Various forms of computer readable media may be involved in carrying one or more sequences of one or more instructions to a processor for execution. The computer program product can also be transmitted via a carrier wave in a network, such as a LAN, a WAN or the Internet. Transmission media can take the form of acoustic or light waves, such as those generated during radio wave and infrared data communications. Transmission media include coaxial cables, copper wire and fiber optics, including the wires that comprise a bus within a computer.

FIG. 13 shows a flowchart of one embodiment of a method of determining an estimate of system-level yield loss for an electronic system. The electronic system includes individual components subject to manufacturing process variability leading to manufacturing defects.

The method 100 starts at a block 102, where a description of the composition of the electronic system, in terms of which individual components are used, is obtained. Next at a block 104, statistical properties of the performance of individual components of the electronic system, with respect to first and second performance variables, are obtained. The statistical properties may include, for example, correlation information of the first and second performance variables. Moving to a block 106, information about execution of an application on the system is obtained. Next at a block 108, the statistical properties of the first and second performance variables of the individual components are propagated to the electronic system so that the correlations between the first and second performance variables are preserved. The propagating may take into account the application information.

FIG. 14 shows a flowchart of one embodiment of a method of determining an estimate of system-level yield loss for an application. The application includes a set of individual tasks subject to statistical variability.

The method 200 starts at a block 202, where a description of the application is obtained in function of the set of tasks to be executed. Next at a block 204, statistical properties of the individual tasks of the application, with respect to a first and second performance variables, are obtained. The statistical properties may include, for example, correlation information of the first and second performance variables. Moving to a block 206, information about a system onto which the application is executed is obtained. Next at a block 208, the statistical properties of the first and second performance variables of the individual tasks are propagated to the application so that the correlations between the first and second performance variables are preserved. The propagating may take into account the information about the system onto which the application is executed.

FIG. 15 shows a block diagram illustrating one embodiment of a system-level simulator for evaluating performance of an electronic system. The electronic system includes individual components subject to manufacturing process variability leading to manufacturing defects.

The system 300 may comprise a first receiving module 302 configured to receive a description of the composition of the electronic system in terms of which individual components are used. The system 300 may further comprise a second receiving module 304 configured to receive statistical properties of the individual components of the electronic system with respect to performance. The system 300 may further comprise a third receiving module 306 configured to receive information about execution of an application on the system. The system 300 may further comprise an evaluator configured to evaluate the performance of the system based on the statistical properties of the performance distribution of the individual components, taking into account the application information.

In some embodiments, the system 300 is formed as a modeling tool adapted for carrying out a method described above. In one embodiment, the evaluator 308 may further comprise a calculating module configured to automatically determine system-level yield of the electronic system, by manipulation of the probability density functions of the statistical properties of the performance of the individual components with respect to first and second performance variables.

Although systems and methods as disclosed, is embodied in the form of various discrete functional blocks, the system could equally well be embodied in an arrangement in which the functions of any one or more of those blocks or indeed, all of the functions thereof, are realized, for example, by one or more appropriately programmed processors or devices The foregoing description details certain embodiments of the invention. It will be appreciated, however, that no matter how detailed the foregoing appears in text, the invention may be practiced in many ways. It should be noted that the use of particular terminology when describing certain features or aspects of the invention should not be taken to imply that the terminology is being re-defined herein to be restricted to including any specific characteristics of the features or aspects of the invention with which that terminology is associated.

While the above detailed description has shown, described, and pointed out novel features of the invention as applied to various embodiments, it will be understood that various omissions, substitutions, and changes in the form and details of the device or process illustrated may be made by those skilled in the technology without departing from the spirit of the invention. The scope of the invention is indicated by the appended claims rather than by the foregoing description. All changes which come within the meaning and range of equivalency of the claims are to be embraced within their scope. For example, any formulas given above are merely representative of procedures that may be used. Functionality may be added or deleted from the block diagrams and operations may be interchanged among functional blocks. Steps may be added or deleted to methods described within the scope of the present invention.

What is claimed is:

1. A method of determining an estimate of system-level yield loss for an electronic system comprising individual components, the method comprising:
    obtaining a description of the composition of the electronic system in terms of all individual components present in the electronic system;
    obtaining statistical properties of a performance of all individual components present in the electronic system with respect to a first and second performance variables, the first performance variable being different from the second performance variable, the statistical properties comprising correlation information of the first and second performance variables;
    obtaining information about execution of an application on the system;
    propagating the statistical properties of the first and second performance variables of the individual components present in the electronic system to the electronic system, so that correlations between the first and second performance variables are preserved, the propagating taking into account the information about execution of an application on the system; and
    determining the estimate of the system-level yield loss based on the propagated statistical properties of the first and second performance variables,
    wherein the method is performed by one or more computing devices,
    wherein the statistical properties of the performance of individual components are probability density functions (PDFs), frequency distributions or binned histograms of random data, or any other form of statistical representation of the data, wherein propagating the statistical properties comprises manipulation of the probability density functions, wherein propagating the statistical properties comprises separately propagating the probability density functions for the first performance variable and for the second performance variable,
    wherein the method further comprising:
    projecting probability density functions on the first performance variable and second performance variable axes; and
    subsequently performing transformations related to the first and second performance variable metric.

2. The method according to claim 1, wherein the first performance variable is delay, and the second performance variable is energy.

3. The method according to claim 1, wherein propagation laws of the first and second performance variables from the component-level to the system-level are different.

4. The method according to claim 3, wherein the propagation law of the first performance variable is a max operator, and the propagation law of the second performance variable is a sum operator.

5. The method according to claim 4, wherein the sum operator provides a weighted sum.

6. The method according to claim 1, wherein the method is adapted for estimating the system-level yield loss of electronic systems that use configuration options allowing runtime first and second performance variable trade-offs, by using a plurality of bivariate probability density functions.

7. The method according to claim 1, wherein manipulation of the probability density functions is an analytical calculation.

8. The method according to claim 1, wherein manipulation of the probability density functions is a numerical calculation.

9. The method according to claim 1, wherein the statistical properties of the performance of individual components have a Gaussian distribution.

10. The method according to claim 1, wherein the statistical properties of the performance of individual components comprise non-Gaussian distributions.

11. The method according to claim 1, wherein obtaining statistical properties of the performance of the individual components is performed via transistor-level simulations, statistical estimation, Monte-Carlo simulations or measurements.

12. The method according to claim 1, the method further comprising calculating probability distribution of delay of the electronic system from the information of its underlying individual components.

13. The method according to claim 1, wherein the method further comprises calculating probability distribution of energy consumption of the electronic system from the information of its underlying individual components.

14. The method according to claim 13, wherein calculating the probability distribution of the energy consumption of the electronic system comprises using Fourier transforms.

15. The method according to claim 1, the method further comprising:
    obtaining a description of an application to be executed on the electronic system, the application comprising a set of individual tasks which are subject to statistical variability, the description of the application comprises a function of the set of tasks to be executed,
    obtaining statistical properties of the individual tasks of the application with respect to at least the first and second performance variables, the statistical properties comprising correlation information of the first and second performance variables,
    obtaining information about the electronic system onto which the application is to be executed, and
    propagating the statistical properties of the first and second performance variables of the individual tasks to the application so that the correlations between the first and second performance variables are preserved, the propagating taking into account the information about the system onto which the application is to be executed.

16. The method according to claim 15, wherein obtaining statistical properties of the individual tasks of the application to be executed on the electronic system is performed based on profiling a run-time workload prediction technique.

17. The method according to claim 15, the method further comprising taking into account variability on tasks performance variables due to changing clock frequency at run-time.

18. The method according to claim 1, wherein the information about execution comprises how many times each of the components of the electronic system is accessed by the application.

19. A modeling tool adapted for carrying out a method of claim 1, the tool comprising:
a first receiving module configured to receive a description of the composition of an electronic system in terms of all individual components present in the electronic system;
a second receiving module configured to receive distribution of statistical properties of a performance of all individual components with respect to first and second performance variables;
a third receiving module configured to receive information about execution of an application on the system;
a calculating module configured to automatically determine system-level yield of the electronic system, by manipulation of probability density functions of the statistical properties of the performance of all individual components with respect to first and second performance variables; and
a computing device configured to execute at least one of the modules.

20. The modeling tool according to claim 19, wherein the calculating module is adapted for taking into account reconfigurability of the individual components.

21. A non-transitory computer-readable medium having stored therein a computer program configured to perform the method of claim 1 when executed on a computer.

22. A method of determining an estimate of system-level yield loss for an electronic system comprising individual components, the method comprising:
obtaining a description of the composition of the electronic system in terms of all individual components present in the electronic system;
obtaining statistical properties of a performance of all individual components present in the electronic system with respect to a first and second performance variables, the first performance variable being different from the second performance variable, the statistical properties comprising correlation information of the first and second performance variables;
obtaining information about execution of an application on the system;
propagating the statistical properties of the first and second performance variables of the individual components present in the electronic system to the electronic system, so that correlations between the first and second performance variables are preserved, the propagating taking into account the information about execution of an application on the system; and
determining the estimate of the system-level yield loss based on the propagated statistical properties of the first and second performance variables,
wherein the method is performed by one or more computing devices,
wherein the statistical properties of the performance of individual components are probability density functions (PDFs), frequency distributions or binned histograms of random data, or any other form of statistical representation of the data, wherein propagating the statistical properties comprises manipulation of the probability density functions,
wherein propagating the statistical properties comprises simultaneously propagating a combined probability density function for the first and second performance variables.

23. The method according to claim 22, wherein the combined propagation is described, for two bivariate PDFs, by $$f_c[t_d, P_w] = \int_{-\infty}^{\tau_d} \int_{-\infty}^{\infty} (f_1[t_d, P_w - v_p] f_2[u_t, v_p] + f_1[u_t, P_w - v_p] f_2[t_d, v_p]) dv_p du_t,$$

wherein $f_c[t_d, P_w]$ is the combined first performance variable—second performance variable PDF, $f_1$ is a first first performance variable—second performance variable PDF, and $f_2$ is a first first performance variable—second performance variable PDF.

24. A system-level simulator for evaluating performance of an electronic system comprising individual components to provide an estimate of system-level yield loss for the electronic system, the simulator comprising:
a first receiving module configured to receive a description of the composition of the electronic system in terms of all individual components present in the electronic system;
a second receiving module configured to receive statistical properties of a performance of all individual components present in the electronic system with respect to a first and second performance variables, the first performance variable being different from the second performance variable, the statistical properties comprising correlation information of the first and second performance variables;
a third receiving module configured to receive information about execution of an application on the system;
an evaluation module configured to evaluate a performance of the system based on propagating the statistical properties of the first and second performance variables of the individual components present in the electronic system to the electronic system so that the correlations between the first and second performance variables are preserved, the propagating taking into account the information about execution of an application on the system, and to determine the estimate of the system-level yield loss based on the propagated statistical properties of the first and second performance variables; and
a computing device configured to execute at least one of the modules,
wherein the statistical properties of the performance of individual components are probability density functions (PDFs), frequency distributions or binned histograms of random data, or any other form of statistical representation of the data, wherein the evaluation module propagates the statistical properties by manipulating the probability density functions, wherein the evaluation module separately propagates the probability density functions for the first performance variable and for the second performance variable, wherein the evaluation module is further configured to project probability density functions on the first performance variable and second performance variable axes, and to subsequently perform transformations related to the first and second performance variable metric.

25. The system-level simulator according to claim 24, wherein the information about execution comprises how many times each of the components of the electronic system is accessed by the application.

* * * * *